(12) United States Patent
Kumar Saha et al.

(10) Patent No.: US 12,731,579 B2
(45) Date of Patent: Sep. 8, 2026

(54) COMMAND GENERATION SYSTEM AND METHOD OF ISSUING COMMANDS

(71) Applicant: Hitachi Energy Ltd, Zürich (CH)

(72) Inventors: Barun Kumar Saha, Bidhannagar (IN); Luca Haab, Bern (CH); Lukasz Podleski, Liebefeld (CH)

(73) Assignee: HITACHI ENERGY LTD, Zürich (CH)

( * ) Notice: Subject to any disclaimer, the term of this patent is extended or adjusted under 35 U.S.C. 154(b) by 120 days.

(21) Appl. No.: 18/283,324

(22) PCT Filed: Mar. 23, 2022

(86) PCT No.: PCT/EP2022/057706
§ 371 (c)(1),
(2) Date: Sep. 21, 2023

(87) PCT Pub. No.: WO2022/200471
PCT Pub. Date: Sep. 29, 2022

(65) Prior Publication Data

US 2024/0177710 A1 May 30, 2024

(30) Foreign Application Priority Data

Mar. 23, 2021 (IN) ............................. 202141012400
May 17, 2021 (EP) .................................... 21174217

(51) Int. Cl.
*G10L 15/22* (2006.01)
*G06F 9/54* (2006.01)
(Continued)

(52) U.S. Cl.
CPC .......... *G10L 15/1822* (2013.01); *G06F 9/541* (2013.01); *G06F 9/547* (2013.01); *G10L 15/26* (2013.01)

(58) Field of Classification Search
CPC ................................ G10L 15/18; G10L 15/22
See application file for complete search history.

(56) References Cited

U.S. PATENT DOCUMENTS 8,898,109 B2 11/2014 Neerincx et al.
10,521,189 B1 * 12/2019 Ryabov ................ G06F 40/117
(Continued)

FOREIGN PATENT DOCUMENTS

CA 3064116 A1 6/2020
CN 109725961 A 5/2019
(Continued)

OTHER PUBLICATIONS

Tsuzaki, Yoshiharu, and Yasuo Okabe. "Reactive configuration updating for intent-based networking." 2017 International Conference on Information Networking (ICOIN). IEEE, 2017. (Year: 2017).*

(Continued)

*Primary Examiner* — Jialong He
(74) *Attorney, Agent, or Firm* — PROCOPIO, CORY, HARGREAVES & SAVITCH LLP

(57) ABSTRACT

A command generation system for issuing commands to an actor of a utility system, industrial system or communication network implements an Intent-based Network and comprises a first interface operative to receive natural language input that specifies a task to be executed, one or several processing modules operative to perform a stateful intent resolution process to determine a user's intent expressed by the natural language input and to generate at least one command based on the determined intent, and a second interface operative to issue the at least one command to the actor to cause execution of the task in the utility system, industrial system or communication network.

18 Claims, 15 Drawing Sheets

(51) Int. Cl.

| | |
|---|---|
| ***G10L 15/18*** | (2013.01) |
| ***G10L 15/26*** | (2006.01) |

(56) References Cited

U.S. PATENT DOCUMENTS

| | | | | |
|---|---|---|---|---|
| 10,585,957 | B2 | 3/2020 | Heck et al. | |
| 2009/0187579 | A1 | 7/2009 | Brancaccio et al. | |
| 2012/0035935 | A1* | 2/2012 | Park | G10L 15/22 704/E21.001 |
| 2014/0070925 | A1* | 3/2014 | Shin | G08C 17/02 340/12.5 |
| 2014/0365209 | A1 | 12/2014 | Evermann | |
| 2016/0163311 | A1 | 6/2016 | Crook et al. | |
| 2016/0219048 | A1 | 7/2016 | Porras et al. | |
| 2016/0241436 | A1 | 8/2016 | Fourie et al. | |
| 2017/0357637 | A1 | 12/2017 | Nell et al. | |
| 2018/0260680 | A1* | 9/2018 | Finkelstein | G06N 5/04 |
| 2020/0043482 | A1 | 2/2020 | Grubber et al. | |
| 2020/0257734 | A1 | 8/2020 | Steinfort | |
| 2021/0005191 | A1* | 1/2021 | Chun | G10L 15/30 |
| 2021/0064203 | A1* | 3/2021 | Yue | G06F 40/284 |
| 2022/0050968 | A1* | 2/2022 | Xie | H04L 51/02 |

FOREIGN PATENT DOCUMENTS

| | | | |
|---|---|---|---|
| CN | 109815326 | A | 5/2019 |
| CN | 110313154 | A | 10/2019 |
| CN | 110462730 | A | 11/2019 |
| CN | 111557001 | A | 8/2020 |
| CN | 112463920 | A | 3/2021 |
| JP | 2001-306199 | A | 11/2001 |
| JP | 2018-026708 | A | 2/2018 |
| JP | 2020-518992 | A | 6/2020 |

OTHER PUBLICATIONS

Saha, Barun Kumar, et al. “Intent-based networks: An industrial perspective.” Proceedings of the 1st international workshop on future industrial communication networks. 2018. (Year: 2018).*

Kiran et al., “Enabling intent to configure scientific networks for high performance demands”, Future Generation Computer Systems, vol. 79, Apr. 20, 2017, pp. 205-214, XP085254538, ISSN: 0167-739X, DOI: 10.1016/J.FUTURE.2017.04.020.

Yao et al., “Intention Based Networking Management”. Developing Networks using Artificial Intelligence pp. 199-224. Springer Nature Switzerland AG, published in 2019.

Xia et al., “NEMO (NEtwork MOdeling) Language draft-xia-sdnrg-nemo-language-04” Huawir Technologies Co., Ltd, Apr. 14, 2016, 24 pages.

Pang et al., “A Survey on INTENT-Driven Networks”, IEEE Access, IEEE, USA, vol. 8, Jan. 23, 2020 (Jan. 23, 2020), pp. 22862-22873, XP011770444, DOI: 10.1109/ACCESS.2020.2969208 [retrieved on Feb. 40, 2020].

Jacobs et al., “Refining Network Intents for Self-Driving Networks” SelfDN ’18, Aug. 24, 2018, Budapest, Hungary, pp. 15-21. DOI: 10.1145/3229584.3229590.

Zeydan et al., “Recent Advances in Intent-Based Networking: A Survey”, 2020 IEEE 91ST Vehicular Technology Conference (VTC2020-SPRING), IEEE, May 25, 2020 (May 25, 2020), pp. 1-5, XP033786763, DOI: 10.1109/VTC2020-SPRING48590.2020.9128422 [retrieved on Jun. 29, 2020].

Keiko Shimazu et al: “Segmentation of the Access Log on Web Server for Information Sharing”, The 46th Basic Theory of Artificial Intelligence Workshop Materials (SIG-FAI / KBS-J) The 54th Knowledge-based Systems Workshop Materials (SIG-FAI / KBS-J), Japan, The Society of Artificial Intelligence, Nov. 12, 2001, p. 147-152.

Wikipedia, “Decision tree learning—Wikipedia”, Mar. 20, 2021 (Mar. 20, 2021), pp. 1-13, XP093357259, Retrieved from the Internet [DI] 2-4,8-9,11,13 * the whole document *[X] 1,5-7,10,12,14-15.

* cited by examiner

| **Transaction ID** | **T_1** | | | |
|---|---|---|---|---|
| **Serial no.** | Intent ID | Start time | End time | Network state |
| **1** | I_1 | t_1_0 | t_1_1 | S(T_1, I_1) |
| **2** | I_2 | t_2_0 | t_2_1 | S(T_1, I_2) |
| **3** | I_3 | t_3_0 | t_3_1 | S(T_1, I_3) |
| **…** | … | … | … | … |
| **j** | I_j | t_j_0 | t_j_1 | S(T_1, I_j) |
| **j+1** | I_(j+1) | t_(j+1)_0 | | |

160

| Intent | Type | Description | Attributes |
| --- | --- | --- | --- |
| **create_flow_unicast** | Simple | Create a network flow between two endpoints with optional QoS requirements. | 'primary': ('source', 'target'), 'secondary': ('qos', 'operator') |
| **create_nfv** | Simple | Create a virtual network function [if a functional one is currently unavailable]. | 'primary': ('vnf1'), 'secondary': ('endpoint1', 'endpoint2', 'vnf2', 'vnf3') |
| **apply_filter** | Simple | Modify traffic characteristics of a flow. Create the flow if it does not exist. | 'primary': ('action'), 'secondary': ('port', 'src_port', 'dst_port', 'source', 'target') |
| **create_flow_unicast+create_nfv** | Composite | | 'primary': ('source', 'target', 'vnf1'), 'secondary': ('qos', 'operator', 'endpoint1', 'endpoint2', 'vnf2', 'vnf3') |
| **create_flow_unicast+apply_filter** | Composite | | 'primary': ('source', 'target', 'action'), 'secondary': ('qos', 'operator', 'port', 'src_port', 'dst_port', 'source', 'target') |
| **create_nfv+apply_filter** | Composite | | 'primary': ('vnf1', 'action'), 'secondary': ('endpoint1', 'endpoint2', 'vnf2', 'vnf3', 'port', 'src_port', 'dst_port', 'source', 'target') |
| **create_flow_unicast+create_nfv+apply_filter** | Composite | | 'primary': ('source', 'target', 'vnf1', 'action'), 'secondary': ('qos', 'operator', 'endpoint1', 'endpoint2', 'vnf2', 'vnf3', 'port', 'src_port', 'dst_port', 'source', 'target') |

FIG. 10

COMMAND GENERATION SYSTEM AND METHOD OF ISSUING COMMANDS

CROSS-REFERENCE TO RELATED APPLICATIONS

The present application is a national stage entry of International Patent Application No. PCT/EP2022/057706, filed on Mar. 23, 2022, which claims priority to Indian Patent Application No. 202141012400, filed on Mar. 23, 2021, and European Patent Application No. 21174217.6, filed on May 17, 2021, which are all hereby incorporated herein by reference as if set forth in full.

FIELD OF THE INVENTION

The present disclosure relates to methods, devices, and systems for issuing commands to a utility system (such as an electric power system), industrial system (such as an industrial manufacturing plant), and/or a communication network (such as a communication network of a utility system or industrial system). The present disclosure relates to methods, devices, and system that can be used to initiate tasks in utility systems, industrial systems or communication networks when commissioning or reconfiguring a utility system, industrial system, or communication network or during ongoing field operation of the utility system, industrial system, or communication network.

BACKGROUND OF THE INVENTION

Modern industrial automation control systems (IACS), such as power generation systems, power distribution system, power transmission systems, power grids, or substations, and modern industrial systems include a vast number of components. Operation of a utility system, industrial system, or communication network, such as a communication network of an industrial automation control system (IACS), requires devices of the network to be configured during commissioning or reconfigured after the utility system, industrial system, or communication network has entered operation. For illustration, a network engineer must look at the operational state and make appropriate changes when required, for example, introducing a set of new traffic flows and/or removing existing traffic flows. Network Management Systems (NMSs) or other actors in the utility system, industrial system, or communication network can be deployed to help in this regard.

Even when an NMS or other actor is deployed, it may be difficult to use. Although communication networks continue to evolve, their management still remains a complex device-centric task, which involves locating target devices and connections and manually reconfiguring them. The step of human-based command generation can often introduce configuration errors, which can potentially disrupt a utility system or communication network. Such network blackouts, however, cannot be afforded by mission-critical networks, e.g., power grids.

Configuration errors can often arise because operators are expected to be very fluent with individual device settings and to be accurate in executing the correct commands. However, in reality, such steps are often complex and involve multiple dependent sub-tasks. For example, taking a backup from an intranet server to the cloud can involve 1) finding out a feasible bandwidth path that does not throttle other flows, 2) creating a firewall and whitelisting appropriate flows, and 3) installing appropriate rules in the concerned switches. It is also difficult to keep track of a set of operations performed in the past and the resulting change in network state.

Thus, the generation of commands that must be issued to an NMS or other actor in a utility system, industrial system, or communication network is challenging, requires extensive system knowledge and experience and, even when performed by a well-trained expert, may be error-prone.

U.S. Pat. No. 10,585,957 B2 discloses a technique for identification of user intents.

M. Kiran et al., "Enabling Intent to Configure Scientific Networks for High Performance Demands", Future Generation Computer Systems, Int. J. Electron. Telecommun. 60(4), 2014 provides a tool for data-intensive activities in scientific networks.

SUMMARY

There is a need to provide improved techniques for initiating execution of a task in a utility system, industrial system, or communication network, in particular a communication network of an industrial system or utility system. There is in particular a need for improved techniques that allow a desired task to be initiated in a simple manner while being less error-prone than conventional approaches that rely on human-generated commands. There is a need for improved techniques that allow flow management, device configuration or reconfiguration, or other tasks to be performed when commissioning a utility system, industrial system or communication network or when reconfiguring the utility system, industrial system, or communication network during use.

According to an embodiment, methods and systems are provided in which natural language input is received and interpreted to determine an intent for flow management or other utility system actions, industrial system actions, or communication network actions.

The systems and methods according to an embodiment are operative to understand a user's (e.g., a network operator's) intent expressed in natural language, decompose high-level intent into sub-tasks, and trigger appropriate commands by interfacing with a network management system (NMS) or another actor in a utility system, industrial system, or communication network.

The systems and methods according to an embodiment allow the cognitive load of human users (e.g., operators) to be reduced and, thereby, reduce the risk of configuration errors. This, in turn, can help to reduce the cost, troubleshooting effort and time, and downtime of the utility system, industrial system, or communication network.

An Intent-based Network (IBN) may be provided which takes an intended task expressed in natural language input as input and is operative to automatically or semi-automatically generate and output appropriate network command(s) to effect implementation of the task.

The network intent can involve a simple task (such as installing a rule in a switch) or can be a complex one. The IBN may therefore be operative to identify both simple intents and composite intents composed of $k>1$ simple intents.

The IBN may be trained with a set of simple and composite intents to generate a classification model. Network entities can also be extracted by the IBN based on the intents set. Subsequently, when a user inputs natural language input, the IBN classifies the input text into an intent class and identifies the network entities, if any.

Since two similar texts can belong to two different intent classes, an ambiguity can arise during the classification process. To address this, intent classification confidence information may be determined and taken into consideration when generating and/or outputting the command(s). For illustration, a classification tree may be constructed automatically and a path with a highest confidence score may be identified. The intent at a root of the path (or sub-path) is identified as the most likely target intent. The system may be operative to confirm the identified intended task via user feedback at a user interface.

The IBN may be operative to communication with an NMS or other actor in the utility system, industrial system, or communication network, and to issue command(s) thereto. The NMS or other actor, in turn, triggers network tasks to achieve the task expressed by the natural language input. When all tasks are executed, the NMS or other actor may capture and communicate a network state to the IBN.

The intent resolution process may be stateful. The IBN maintains transactions of intents and network commands. Thereby, the command generation system and method take into account previously identified intents and/or previously output commands when determining which command is to be output next. The user (e.g., network operator) does no longer have to keep track of the previously issued commands and/or the network state. This simplifies the configuration or reconfiguration process using the IBN and mitigates the risk of misconfiguration.

According to an aspect, there is provided a command generation system for issuing commands to an actor of a utility system, industrial system or communication network. The command generation system comprises a first interface operative to receive natural language input that specifies a task to be executed. The command generation system comprises one or several processing modules operative to perform a stateful intent resolution process to determine a user's intent expressed by the natural language input and to generate at least one command based on the determined intent. The command generation system comprises a second interface operative to issue the at least one command to the actor to cause execution of the task in the utility system, industrial system or communication network.

The command generation system may implement an Intent-based Network (IBN).

The actor may be a management or control system. The actor may be a network management system (NMS).

The command generation system may be operative to maintain one or several intent transactions, and if a termination criterion is not fulfilled, use an intent transaction that provides information on previously identified intents within a same session to perform intent resolution.

The actor may be a management or control system of a utility system, industrial system or communication network of a utility system or industrial system.

The command generation system may be operative to quantitatively determine how reliable an identification of the user's intent is and to use confidence information to determine whether a command can be output automatically or whether user confirmation is required.

The command generation system may be operative to generate and issue commands to a controlled system that may be a utility system (such as an electric power grid, e.g. a power distribution grid or a power transmission grid, a fluid grid for enabling and controlling flow of at least one fluid such as gas, water, waste water, or other fluids, or other utility system).

The command generation system may be operative to generate and issue commands to a controlled system that may be an industrial system, such as an industrial system having an industrial automation control system (IACS). The controlled system may be a substation of an electric power grid.

The command generation system may be operative to generate and issue commands to a controlled system that may be a communication network, in particular a communication network of a utility system (such as an electric power grid or another utility grid) or of an industrial system. The controlled system may be a communication network of an electric power system or of an electric power system substation.

The command generation system may be operative to perform the stateful intent resolution process using information on previously identified intents and/or previously issued commands.

The command generation system may comprise or may be communicatively coupled to a data storage system that stores the information on previously identified intents and/or previously issued commands.

The data storage system may be provided in the IBN.

The data storage system may be provided in the utility system, industrial system or communication network.

The command generation system may be operative to cause storage of information on the determined intent and/or the least one command in the data storage system.

The command generation system may be operative to cause storage of information on the determined intent and/or the least one command in the data storage system in response to a confirmation that the task has been executed in the utility system, industrial system or communication network.

The confirmation may comprise receipt of data from the utility system, industrial system or communication network.

The command generation system may be operative to perform a verification that includes verifying that the user's intent expressed by the natural language input is consistent with the previously identified intents and/or the previously issued commands prior to issuing the at least one command.

Alternatively or additionally to using information in on previously identified intents and/or previously issued commands, the command generation system may be operative to retrieve state information on a state of the utility system, industrial system or communication network.

The command generation system may be operative to perform a verification that includes verifying that the user's intent expressed by the natural language input is consistent with the retrieved state information prior to issuing the at least one command.

The command generation system may be operative to receive and process messages from the utility system, industrial system or communication network that indicate one or several changes in the utility system, industrial system or communication network not triggered by the command generation system. Such changes may be caused by control or protection functions or manual configuration or reconfiguration tasks.

The command generation system may be operative to automatically determine, based on the changes in the utility system, industrial system or communication network, whether a current state of the utility system, industrial system or communication network is still consistent with the previously identified intents and/or the previously issued commands.

The command generation system may be operative to automatically generate and output additional commands in response to determining that the current state of the utility system, industrial system or communication network is not consistent with the previously identified intents and/or the previously issued commands.

The command generation system may be operative to automatically generate and output the additional commands to bring the current state of the utility system, industrial system or communication network in conformity with the previously identified intents and/or the previously issued commands.

The command generation system may be operative to automatically generate and output the additional commands without receiving user input when determining that the current state of the utility system, industrial system or communication network is not consistent with the previously identified intents and/or the previously issued commands.

The command generation system may be operative to assign the natural language input to at least one intent class.

The intent class may be selected from a group consisting of a plurality of simple intents and a plurality of composite intents.

Each composite intent of the plurality of composite intents may be composed of two or more simple intents selected from the plurality of simple intents.

The command generation system may be operative to automatically generate the plurality of composite intents.

The command generation system may be operative to automatically generate the plurality of composite intents by natural language processing (NLP)-based combinations of simple intents selected from the plurality of simple intents.

The stateful intent resolution process may comprise assigning the natural language input to the at least one intent class.

The command generation system may be operative to determine confidence information for a classification into different intent classes.

The confidence information may be a scalar numerical value.

The confidence information may quantify reliability of classification results.

The confidence information may be determined in accordance with a metric.

The command generation system may be operative to use the confidence information to assign the natural language input to at least one intent class and/or to output the confidence information.

The command generation system may be operative to generate a confidence tree to determine the confidence information, Each node of the confidence tree may be associated with one of the plurality of simple intents or one of the plurality of composite intents.

Alternatively or additionally, the confidence tree may comprise at least one node associated with one of the plurality of composite intents and at least two nodes each associated with simple intents selected from the plurality of simple intents.

Alternatively or additionally, a node of the confidence tree associated with one of the plurality of composite intents has child nodes that are associated with composite or simple intents from which the one of the plurality of composite intents is formed, Determining the confidence information for different intent classes may comprise identifying a path through the tree from among all possible paths through the tree based on confidence values assigned to nodes and/or links of the confidence tree.

Determining the confidence information for a path may comprise multiplying confidence values for each node (determined for the respective natural language input) along a path from a leaf node upward along the tree to the respective ancestor node until the confidence value for the ancestor node is zero.

Determining a most likely intent from the confidence tree may comprise determining the child node of the root note for which the confidence information along the path is maximum.

The command generation system may be operative to identify one or several attributes for the at least one intent class from the natural language input.

The command generation system may be operative such that the at least one command is dependent on the identified one or several attributes.

The attribute(s) may comprise attribute(s) that identify system entities in the controlled utility system, industrial system, or communication network.

A (partial) ontology may be used to identify system entities based on the natural language input.

The identified one or several attributes may comprise one or several of: a source of a flow, a target of a flow, an action to be performed, a quality of service, an identifier for a virtual network function.

The command generation system may be operative to maintain one or several intent transactions.

The command generation system may be operative to concurrently maintain plural different intent transactions, each of which is associated with a different user.

The command generation system may be operative to establish an intent transaction in response to receipt of the natural language input if there is no active intent transaction for a user from which the natural language input is received.

The command generation system may be operative to include at least an identifier for the determined intent expressed by the natural language input is in the intent transaction.

The command generation system may be operative to include an execution time for the determined intent is included in the intent transaction.

The execution time may comprise a start time and an end time.

The command generation system may be operative to, if a termination criterion is not fulfilled, add further user's intents expressed by further natural language inputs of the same user into the intent transaction. This may comprise adding further identifiers for the user's further intents expressed by the further natural language inputs to the intent transaction. Execution times for the user's further intents may optionally be added to the intent transaction.

The command generation system may be operative to, if a termination criterion is not fulfilled, use the intent transaction (i.e., the information on the previously identified intents within the same session) to perform intent resolution.

The command generation system may be operative to, if a termination criterion is fulfilled, terminate adding further user's intents to the intent transaction.

The termination criterion may comprise any one or any combination of a time threshold criterion, receipt of a command for terminating the intent transaction, receipt of a command to load a previous intent transaction.

The command generation system may be operative to concurrently maintain and update a first intent transaction for a first user and a second intent transaction for a second user different from the first user.

The command generation system may be operative to execute an intent supervisor operative to continually monitor the utility system, industrial system or communication network.

The intent supervisor may be operative to ensure automatic adaptation of the command generation system to changes in the utility system, industrial system or communication network.

Ensuring automatic adaptation of the command generation system to changes in the utility system, industrial system or communication network may comprise one or several of: automatically generating and issuing at least one additional command in response to detecting a change in topology and/or entity states to ensure that the utility system, industrial system or communication network remains operative in accordance with the user's intent expressed by the natural language input: verifying that the determined intent expressed by the natural language input is consistent with previously received user's intents and/or a state of the utility system, industrial system or communication network: verifying that execution of the at least one command causes the utility system, industrial system or communication network to reach a target state.

The first interface may be operative to receive the natural language input as text input.

The first interface may be a web-based interface.

The first interface may be operative to receive the natural language input as speech input.

The command generation system may comprise a speech-to-text conversion module to convert the speech input to text input prior to performing the stateful intent resolution process.

The first interface may be operative to receive the natural language input as freehand user input via a graphical user interface.

The command generation system may be operative to use labeled natural language input for training at least one classifier model for performing intent classification.

The command generation system may be operative to use the labeled natural language input for training an entity extractor, operative to extract system entities of the controlled system from natural language input.

The command generation system may be operative to apply NLP techniques to the labeled natural language input to generate additional training data.

The additional training data may comprise composite intents composed of several labeled simple intents.

According to another aspect, there is provided a system that comprises a utility system, industrial system or communication network having an actor, and the command generation system of an embodiment operative to issue the at least one command to the actor.

The actor may be a management or control system, in particular a network management system (NMS).

The controlled system may be a utility system (such as an electric power grid, e.g. a power distribution grid or a power transmission grid, another electric power system, a fluid grid for enabling and controlling flow of at least one fluid such as gas, water, wastewater, or other fluids, or other utility system).

The controlled system that may be an industrial system, such as an industrial system having an industrial automation control system (IACS).

The controlled system may be a substation of an electric power grid.

The controlled system may be a communication network, in particular a communication network of a utility system (such as an electric power grid or another utility grid) or of an industrial system. The controlled system may be a communication network of an electric power system or of an electric power system substation.

According to another aspect, there is provided a method of issuing commands to a utility system, industrial system or communication network. The method comprises: receiving, at a first interface, natural language input that specifies a task; performing a stateful intent resolution process to determine a user's intent expressed by the natural language input; generating at least one command based on the determined intent; and issuing, at a second interface, the at least one command to the actor for execution of the task.

The method may be performed automatically using at least one integrated circuit.

The method may be performed automatically using an Intent-based Network (IBN). The IBN may comprise one or several integrated circuits operative to perform the stateful intent resolution process and generate the at least one command.

The actor may be a management or control system. The actor may be a network management system (NMS).

The commands may be output to a utility system (such as an electric power grid, e.g. a power distribution grid or a power transmission grid, a fluid grid for enabling and controlling flow of at least one fluid such as gas, water, wastewater, or other fluids, or other utility system).

The commands may be output to an industrial system, such as an industrial system having an industrial automation control system (IACS). The controlled system may be a substation of an electric power grid.

The commands may be output to a communication network, in particular a communication network of a utility system (such as an electric power grid or another utility grid) or of an industrial system. The controlled system may be a communication network of an electric power system or of an electric power system substation.

The stateful intent resolution process may use information on previously identified intents and/or previously issued commands.

Performing the stateful intent resolution process may comprise retrieving, from a data storage system, the information on previously identified intents and/or previously issued commands.

The data storage system may be provided in the IBN.

The data storage system may be provided in the utility system, industrial system or communication network.

The method may comprise causing storage of information on the determined intent and/or the least one command in the data storage system.

The method may comprise causing storage of information on the determined intent and/or the least one command in the data storage system in response to a confirmation that the task has been executed in the utility system, industrial system or communication network.

The confirmation may comprise receipt of data from the utility system, industrial system or communication network.

The method may comprise performing a verification that includes verifying that the user's intent expressed by the natural language input is consistent with the previously identified intents and/or the previously issued commands prior to issuing the at least one command.

Alternatively or additionally to using information in on previously identified intents and/or previously issued commands, the method may comprise retrieving state information on a state of the utility system, industrial system or communication network.

The method may comprise performing a verification that includes verifying that the user's intent expressed by the natural language input is consistent with the retrieved state information prior to issuing the at least one command.

The method may comprise receiving and processing messages from the utility system, industrial system or communication network that indicate one or several changes in the utility system, industrial system or communication network not triggered by the command generation system. Such changes may be caused by control or protection functions or manual configuration or reconfiguration tasks.

The method may comprise automatically determining, based on the changes in the utility system, industrial system or communication network, whether a current state of the utility system, industrial system or communication network is still consistent with the previously identified intents and/or the previously issued commands.

The method may comprise automatically generating and outputting additional commands in response to determining that the current state of the utility system, industrial system or communication network is not consistent with the previously identified intents and/or the previously issued commands.

The method may comprise automatically generating and outputting the additional commands to bring the current state of the utility system, industrial system or communication network in conformity with the previously identified intents and/or the previously issued commands.

The method may comprise automatically generating and outputting the additional commands without receiving user input when determining that the current state of the utility system, industrial system or communication network is not consistent with the previously identified intents and/or the previously issued commands.

The method may comprise assigning the natural language input to at least one intent class.

The intent class may be selected from a group consisting of a plurality of simple intents and a plurality of composite intents.

Each composite intent of the plurality of composite intents may be composed of two or more simple intents selected from the plurality of simple intents.

The method may comprise automatically generating the plurality of composite intents.

The method may comprise automatically generating the plurality of composite intents by natural language processing (NLP)-based combinations of simple intents selected from the plurality of simple intents.

The stateful intent resolution process may comprise assigning the natural language input to the at least one intent class.

The method may comprise determining confidence information for a classification into different intent classes.

The confidence information may be a scalar numerical value.

The confidence information may quantify reliability of classification results.

The confidence information may be a metric.

The method may comprise using the confidence information to assign the natural language input to at least one intent class and/or to output the confidence information.

The method may comprise generating a confidence tree to determine the confidence information.

Each node of the confidence tree may be associated with one of the plurality of simple intents or one of the plurality of composite intents.

Alternatively or additionally, the confidence tree may comprise at least one node associated with one of the plurality of composite intents and at least two nodes each associated with simple intents selected from the plurality of simple intents.

Alternatively or additionally, a node of the confidence tree associated with one of the plurality of composite intents has child nodes that are associated with composite or simple intents from which the one of the plurality of composite intents is formed, Determining the confidence information for different intent classes may comprise identifying a path through the tree from among all possible paths through the tree based on confidence values assigned to nodes and/or links of the confidence tree.

Determining the confidence information for a path may comprise multiplying confidence values for each node (determined for the respective natural language input) along a path from a leaf node upward along the tree to the respective ancestor node until the confidence value for the ancestor node is zero.

The method may comprise identifying one or several attributes for the at least one intent class from the natural language input.

The at least one command may be generated such that it is dependent on the identified one or several attributes.

The attribute(s) may comprise attribute(s) that identify system entities of the controlled system.

A (partial) ontology of the controlled system may be used to identify the system entities.

The identified one or several attributes may comprise one or several of: a source of a flow, a target of a flow, an action to be performed, a quality of service, an identifier for a virtual network function.

The method may comprise maintaining one or several intent transactions.

The method may comprise concurrently maintaining plural different intent transactions, each of which is associated with a different user.

The method may comprise establishing an intent transaction in response to receipt of the natural language input if there is no active intent transaction for a user from which the natural language input is received.

The method may comprise including at least an identifier for the determined intent expressed by the natural language input is in the intent transaction.

The method may comprise including an execution time for the determined intent is included in the intent transaction.

The execution time may comprise a start time and an end time.

The method may comprise, if a termination criterion is not fulfilled, adding further user's intents expressed by further natural language inputs of the same user into the intent transaction. This may comprise adding further identifiers for the user's further intents expressed by the further natural language inputs to the intent transaction. Execution times for the user's further intents may optionally be added to the intent transaction.

The method may comprise, if a termination criterion is not fulfilled, using the intent transaction (i.e., the information on the previously identified intents within the same session) to perform intent resolution.

The method may comprise, if a termination criterion is fulfilled, terminating adding further user's intents to the intent transaction.

The termination criterion may comprise any one or any combination of a time threshold criterion, receipt of a command for terminating the intent transaction, receipt of a command to load a previous intent transaction.

The method may comprise concurrently maintaining and updating a first intent transaction for a first user and a second intent transaction for a second user different from the first user.

The method may comprise continually monitoring, by an intent supervisor, the utility system, industrial system or communication network.

The method may comprise ensuring, by the intent supervisor, automatic adaptation of the command generation system to changes in the utility system, industrial system or communication network.

Ensuring automatic adaptation of the command generation system to changes in the utility system, industrial system or communication network may comprise one or several of: automatically generating and issuing at least one additional command in response to detecting a change in topology and/or entity states to ensure that the utility system, industrial system or communication network remains operative in accordance with the user's intent expressed by the natural language input: verifying that the determined intent expressed by the natural language input is consistent with previously received user's intents and/or a state of the utility system, industrial system or communication network: verifying that execution of the at least one command causes the utility system, industrial system or communication network to reach a target state.

The first interface may be operative to receive the natural language input as text input.

The first interface may be a web-based interface.

The first interface may be operative to receive the natural language input as speech input.

The method may comprise using a speech-to-text conversion module to convert speech input to text input prior to performing the stateful intent resolution process.

The first interface may be operative to receive the natural language input as freehand user input via a graphical user interface.

The method may comprise extracting the natural language input from an input received via the graphical user interface.

The method may comprise using labeled natural language input for training at least one classifier model for performing intent classification.

The method may comprise using the labeled natural language input for training an entity extractor, operative to extract system entities of the controlled system from natural language input.

The method may comprise applying NLP techniques to the labeled natural language input to generate additional training data.

The additional training data may comprise composite intents composed of several labeled simple intents.

According to other embodiments, there is provided a method comprising training at least one classifier model of a command generation system or IBN according to an embodiment.

The method may comprise using labeled natural language input for training at least one classifier model for performing intent classification.

The method may comprise using the labeled natural language input for training an entity extractor, operative to extract system entities of the controlled system from natural language input.

The method may comprise applying NLP techniques to the labeled natural language input to generate additional training data.

According to other embodiments, there is provided a method comprising using a command generation system, in particular a command generation system implementing an IBN, for causing implementation of a task in accordance with a user's natural language input for configuring or re-configuring at least one device of a utility system.

The utility system may be or may comprise an electric power system.

The utility system may be or may comprise an electric power distribution or transmission system.

The utility system may be or may comprise a fluid flow system.

The fluid flow system may be operative to enable controlled flow of a fluid.

The fluid may comprise any one or any combination of gas, water, fresh water, wastewater, fossil fuel, oil, or other fluids.

According to other embodiments, there is provided a method comprising using a command generation system, in particular an IBN, for causing implementation of a task in accordance with a user's natural language input for configuring or re-configuring at least one device of an industrial system.

The industrial system may be or may comprise an industrial system having an IACS.

The industrial system may comprise an electric power substation.

According to other embodiments, there is provided a method comprising using a command generation system, in particular a command generation system implementing an IBN, for causing implementation of a task in accordance with a user's natural language input for configuring or re-configuring at least one device of a communication network.

The communication network may be the communication network of an IACS.

The communication network may be a communication network of a utility system, such as a communication network of an electric power system.

The communication network may be a communication network of an industrial system.

The method may be used to change device settings using natural language input.

The natural language input may be textual input or spoken input.

The use of the command generation system, in particular an IBN, may comprise using the command generation system to implement changes in device settings without requiring the user to navigate through a menu of a graphical user interface (GUI).

The IBN may be used to simplify commissioning, configuration or reconfiguration of a utility system, industrial system, or communication network.

The IBN may be used to change device settings of at least one device during commissioning, configuration or reconfiguration of a utility system, industrial system, or communication network, responsive to natural language input.

According to another aspect, there is provided instruction code executable by at least one processing device, in particular at least one integrated circuit, in particular at least one computer, that causes the at least one processing device to automatically perform the method according to any embodiment.

According to another aspect, there is provided a storage medium having stored thereon instruction code executable by at least one processing device, in particular at least one integrated circuit, in particular at least one computer, that causes the at least one processing device to automatically perform the method according to any embodiment.

The storage medium may be a non-transitory storage medium.

The methods, devices, and systems according to an embodiment can be used for initiating actions, such as flow management, during commissioning and/or field operation of a utility system, industrial system, or communication network in an intuitive manner.

A user's intent is determined based on natural language input, obviating the complexity and challenges faced by an engineer when having to navigate through a complex NMS menu even for implementing small changes.

The methods, devices, and systems according to an embodiment can be used in association with a communication network of an IACS, e.g. a communication network of a power generation, transmission or distribution system. The methods, devices, and systems according to an embodiment allow communication flows and/or power flows to be managed in an intuitive manner, but can also be used for other actions.

BRIEF DESCRIPTION OF THE DRAWINGS

The subject-matter of the present disclosure will be explained in more detail with reference to preferred exemplary embodiments which are illustrated in the attached drawings, in which:

FIG. 10 is a representation of a set of simple and composite intents.

DETAILED DESCRIPTION OF EMBODIMENTS

Figure 1:
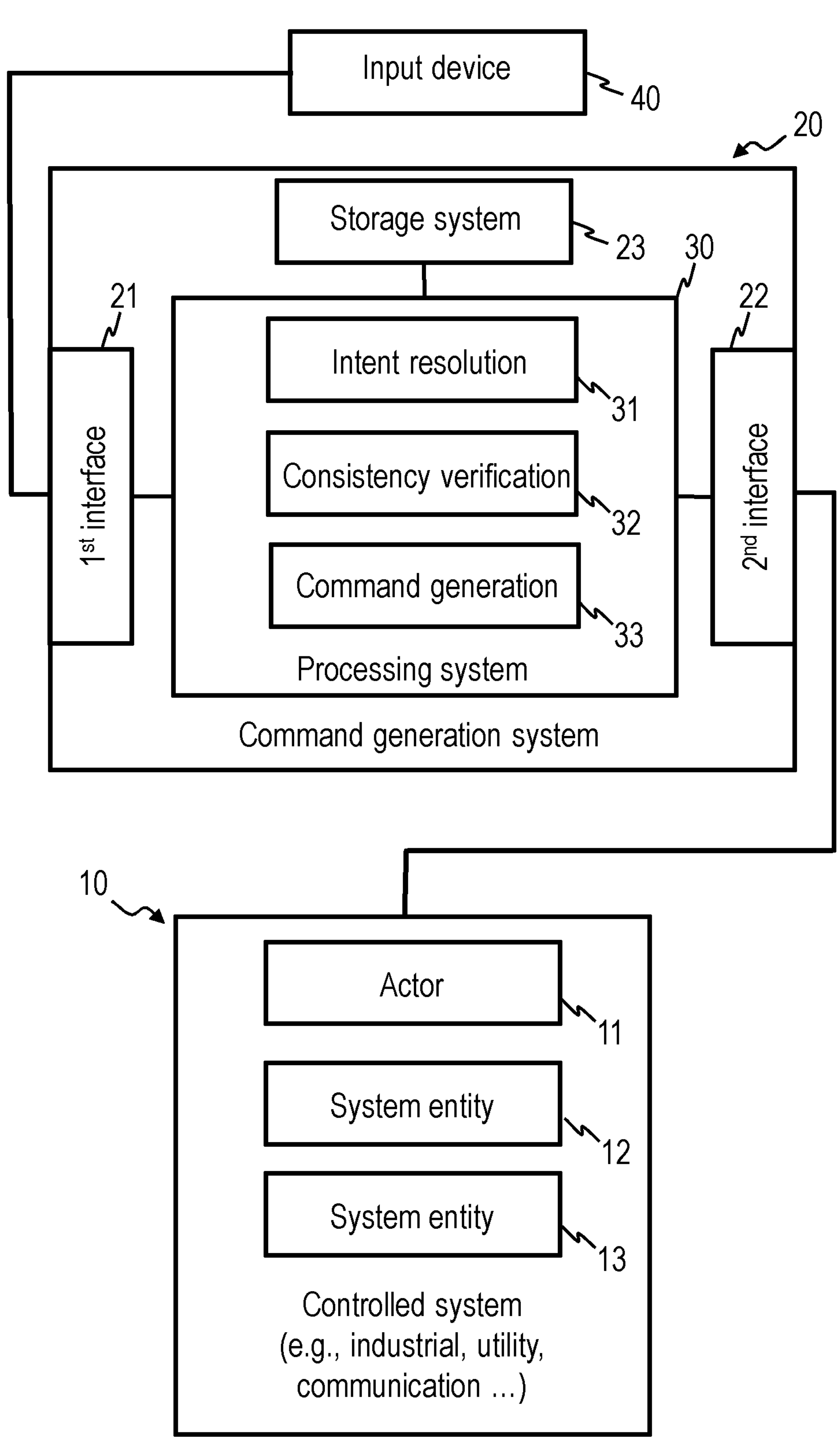
FIG. 1 is a schematic representation of a command generation system coupled to a user input device and a controlled system.

Exemplary embodiments will be described with reference to the drawings in which identical or similar reference signs designate identical or similar elements. While some embodiments will be described in the context of communication systems or other components of a power generation system, a power transmission system, or a power distribution system, the methods and devices described in detail below may be used in a wide variety of systems such as other utility systems or industrial systems.

The features of embodiments may be combined with each other, unless specifically noted otherwise.

According to embodiments, command generation systems and methods are provided that allow natural language input to be received, interpreted, and converted into an appropriate network action.

The command generation system and method are operative to process textual and/or spoken natural language input, determine an intent and, optionally, network entities from the natural language input, and automatically generate and output a command to a network management system (NMS) or other actor in a utility system, industrial system, or communication network.

The command generation system and method are operative to perform a stateful intent resolution. Previously identified intents previously issued commands and/or a state of the utility system, industrial system, or communication network may be taken into consideration by the command generation system and method. For illustration, prior to generating and/or outputting a command that is generated based on intent resolution, the command generation system may verify that command that is to be issued is consistent with previously identified intents, previously issued commands and/or a state of the utility system, industrial system, or communication network. The command generation system may selectively generate and/or output the command generated based on the intent resolution only if the command is consistent with previously identified intents, previously issued commands and/or a state of the utility system, industrial system, or communication network.

As used herein, an "actor" of a controlled system is a device or set of devices operative to implement a command in the controlled system. This may comprise modifying settings and/or other configuration data in one or several controlled devices, such as Intelligent Electronic Devices (IEDs) or communication network devices.

The actor may comprise or may be a management or control system of the controlled system. The actor may be a Network Management System (NMS).

As used herein, the term "network management system" refers to a system that is operative to provision, discover, monitor and maintain networks, such as computer network. The network management system may be implemented using one or several integrated circuit(s) operative to execute computer-readable instruction code to provision, discover, monitor and maintain networks, such as computer network.

As used herein, the terms "consistent" or "consistency" refer to an absence of conflicts. Devices, systems or methods that ensure consistency may be operative to perform acts that verify that there are not conflicts with, e.g., a system state of the controlled system, previously identified intents, and/or previously issued commands. Ensuring consistency may comprise or may consist of verifying that there are no conflicts.

The command generation systems and methods may be operative to quantitatively determine how reliable the identification of the intent is. Confidence information that quantifies the confidence that a natural language input is classified to belong to an intent class may be automatically determined. The confidence information may be used to determine whether a command can be output automatically or whether user confirmation is required. The confidence information may be used to control an interface for requesting user confirmation indicating that the intent has been correctly identified and/or requesting user selection from among plural possible intents that are determined from the natural language input.

The command generation system may be an Intent-based Network (IBN). All of the components of the IBN may reside outside of the utility system, industrial system, or communication network that is being controlled. Alternatively, some of the components of the IBN may reside within the utility system, industrial system, or communication network that is being controlled.

The command generation system and method are operative to perform a stateful resolution of Natural Language (NL)-based simple and composite intents.

Thus, the command generation system and method allow an engineer to interact with a network management system (NMS) or another network actor in a simple and intuitive manner.

The IBN receives desired operations expressed in natural language textual or spoken input and triggers appropriate network tasks. The natural language input can comprise simple or composite expressions, which are then resolved using natural language processing (NLP) and/or natural language understanding (NLU) techniques. The IBN can maintain an overall network state and transactional state of intents in order to ensure that actions of past intents are still complied with. The cognitive load of human operators, chances of misconfigurations, cost, and outage in the utility system, industrial system, or communication network can be reduced.

As an example, a network intent can involve a simple task. e.g., installing a rule in a switch, or can be a complex one that can be broken up in separate sub-tasks (such as identifying a transmission pathway and configuring one or several devices along the transmission pathway for enabling data storage in a cloud device). The former type of intents is referred to as simple and the latter ones as composite. A k-composite intent is made of k distinct simple intents (k>1).

The IBN and method may be operative to consider a set of simple intents (in plain text) and assign a label ("intent class") to each of them. For each such intent, the network entities. e.g., IP address and port number, are also separately labeled. Subsequently. NLP techniques and/or NLU techniques are used to combine simple intents from k different classes to generate the k-composite intents.

The IBN may be trained with a set of simple and composite intents to generate a classification model. Network entities may also be extracted based on the set of intents.

When the IBN receives textual or spoken natural language input, the IBN classifies the input text into an intent class and identifies the network entities, if any.

Since similar texts can belong to different intent classes, an ambiguity can arise during the classification process. To address this, intent classification confidence values can be considered, a classification tree can be constructed, and the path with the highest positive confidence score can be identified. The intent at the root of the path (or sub-path) is most likely the target intent. This can be confirmed with user's feedback.

When the target intent and actions are confirmed by the user, the IBN communicates with the NMS or other actor in the utility system, industrial system, or communication network and issues commands. The NMS or actor is responsive to the command(s) and triggers actions to achieve the desired operation specified by the natural language input. When all tasks are executed, the NMS captures and communicates the network state to an intent supervisor. In addition, the intent resolution process is stateful, and the IBN maintains transactions of intents and network commands.

It will be appreciated that intent identification and entity extraction are prominent aspects of NLP, and both commercial and open source solutions are available to implement the intent identification and entity extraction. The feasibility of the particular implementation used for implementing a user's intents in a utility system, industrial system, or communication network are further described below.

Various features and benefits are attained by embodiments, which include any one or any combination of the following:

- Automatically generating composite intents by NLP-based combinations of simple intents from a database of pre-classified simple intents expressed in natural language. The command generation system or method may automatically generate composite intents that are subsequently used for intent resolution.
- Building a confidence tree based on intent classification results in order to identify the target network intent class. The command generation system or method may automatically quantify the reliability of a classification process in intent resolution.
- Creating, assigning, and maintaining intent transactions to keep track of the changes induced by operators to the utility system, industrial system, or communication network and to preserve the intended network states. This mitigates the challenges faces by operators in tracking the previously issued commands and/or previously identified intents.
- Provision of an NMS or other actors in the utility system, industrial system, or communication network that are controllable with a natural language interface.
- By allowing operators to specify operations in natural language, the system can reduce an operator's cognitive load and chances of misconfiguration. Consequently, down-times of the utility system, industrial system, or communication network.
- Composition of multiple intents can be useful to achieve interoperability between non-homogeneous networks, such as Ethernet and synchronous digital hierarchy (SDH).

Various additional features may be used in embodiments. For illustration, instead of providing a text-based natural language interface, a voice-based interface may be used.

The command generation system and method may use a translation machine to process natural language input received in a language other than a main language (e.g., English) into the main language for processing.

FIG. 1 is a block diagram of a command generation system 20 operative to automatically generate and issue commands to an actor 11 of a controlled system 10. The controlled system may be a utility system, industrial system or communication network. The controlled system may be an electric power substation, an electric power distribution or transmission grid, a communication network of an electric power substation, an electric power distribution or transmission grid, or other utility or industrial system.

The actor 11 may be a management or control system, such as a network management system (NMS).

The command generation system 20 has a first interface 21 operative to receive natural language input. The natural language input may be textual or spoken input. The first interface 21 may be operative for communicative coupling with an input device 40 that allows a user to input textual and/or spoken natural language input. The input device 40 may be a workstation, a mobile device, in particular a portable device, or another input device.

The command generation system 20 is operative to determine a user's intent as expressed by the natural language input and to generate a command based on the identified intent. The command generation system 20 comprises one or several processing modules 30 operative to determine a user's intent as expressed by the natural language input and to generate a command based on the identified intent. The processing modules may comprise one or several integrated circuits (IC(s)). The one or several IC(s) may include one or several of a processor, a microprocessor, a controller, a microcontroller, a field-programmable gate array (FPGA), an application specific integrated circuit (ASIC) or any combination thereof. Some or all of the processing modules may be implemented by a virtual machine (VM). Some or all of the processing modules may be executed in a distributed computing architecture, such as a cloud-based computing infrastructure.

The command generation system 20 is operative to execute an intent resolution module 31. The intent resolution module 31 may execute a classifier that receives the natural language input from the first interface 21 and classifies the natural language input in accordance with one or several intent classes. The intent resolution module 31 may be operative to determine an intent class for the natural language input, with the intent class being selected from a set consisting of plural simple intents and plural composite intents. The composite intents comprise composite intents formed from two, three, and/or more than three simple intents. The intent resolution module 31 may use a classifier with a classification model that is being trained. Training of the classification model may be performed automatically by the command generation system 20.

The command generation system 20 may be operative to execute a consistency verification module 32. The consistency verification module 32 may be included by an intent supervisor, as will be described in more detail below.

The consistency verification module 32 may perform a check on the intent determined by the intent resolution module 31. This may include verifying consistency the intent determined by the intent resolution module 31 as compared to previously determined intents, previously output commands, or a state of the controlled system 10.

The consistency verification module 32 may be operative to perform a verification that includes verifying that the user's intent expressed by the natural language input is consistent with the previously identified intents and/or the previously issued commands prior to issuing at least one command generated based on the intent determined by the intent resolution 31.

Alternatively or additionally to using information in on previously identified intents and/or previously issued commands, the consistency verification module 32 may be operative to retrieve state information on a state of the utility system, industrial system or communication network.

The consistency verification module 32 may be operative to perform a verification that includes verifying that the user's intent expressed by the natural language input is consistent with the retrieved state information prior to issuing the at least one command.

The command generation system 20 is operative to execute a command generation module 33. The command generation module 33 may generate commands that depend on (i) the user's intent as identified by the intent resolution module 31, and (ii) the interface(s) of the actor 33. A look-up table may be used that translates intents and attributes (such as identifiers for network entities or other numerical or alphanumerical attributes) into commands that are issued to the actor 11. When the command generation system 20 is operative to issue commands to several different actor(s) and/or over different interface implementations, different look-up tables may be provided and one of them may be selected to determine a format and attributes of the command(s) that are output via a second interface 22.

The command generation system 20 comprises a second interface 22. The second interface 22 may be an interface operative to output state information to the actor 10. The second interface 22 may be a stateful Application Programming Interface (API). The second interface 22 may be a Representational State Transfer Application Programming Interface (REST API) or gRPC Remote Procedure Call (gRPC) interface, without being limited thereto.

The controlled system 10. i.e., the industrial system, utility system, our communication network, comprises several system entities 12, 13. In response to receiving at least one command that is automatically generated by the command generation system 20, the actor 11 of the controlled system 10 may take appropriate action in accordance with the received command. This may comprise changing settings of one or several of the system entities 12, 13. The system entities 12, 13 may comprise one or several of communication switches (such as Ethernet switches), intelligent electronic devices (IED(s)), firewalls, or other devices.

The command generation system 20 may use information on identified intents and/or issued commands. The command generation system 20 may use this information when determining the intent based on the natural language input. The command generation system 20 may alternatively or additionally use this information when determining whether a command is to be generated and/or output in accordance with the determined intent.

The command generation system 20 may include a storage system 23 in which previously identified intents and/or previously issued commands are being installed. This may be done in various phases. For illustration, the storage system 23 may include a database of previously identified intents and/or previously issued commands. Alternatively or additionally, information on a state of the controlled system 10 may be maintained and stored in the storage system 23.

The storage system 23 does not need to be included in the command generation system 20, but may be provided separately therefrom.

Additional or alternative features that may be implemented by the command generation system 20 in order to determine whether an identified intent and/or a generated command is consistent with previously identified intents are previously identified commands will be described in more detail with reference to FIG. 3 to FIG. 4.

The command generation system 20 may be operative to use natural language processing (NLP)-based techniques to generate composite intents from a set of simple intents. The simple intents and the composite intents may then be used to perform a classifier training, generating a trained classifier model. The command generation system 20 may be operative to perform the classifier training and to generate the trained classifier model. Implementation will be described in more detail with reference to FIG. 5.

The command generation system 20 may be operative to accommodate natural language input from plural different users. The command generation system 20 may generate and manage one open intent transaction per user, as long as natural language input is being received form that user and a termination criterion (which may be user-specific or non-user-specific) is not fulfilled. The intent transaction may provide a data structure into which identified intents, associated time information, and associated resultant network states are aggregated. There may be plural concurrently open intent transactions associated with plural different users.

Additional or alternative features may be implemented by the command generation system 20 to manage the implementation of natural language input from one or several users using intent transactions. Implementation will be described in more detail with reference to FIG. 6 to FIG. 9.

The command generation system 20 may be operative to determine how reliable an intent resolution process is. For illustration, when natural language input is classified using a classifier, the command generation system 20 may be operative to determine to which one of several intent classes the user input is most likely to belong. Alternatively or additionally, the command generation system 20 may be operative to determine whether a user confirmation is required prior to issuing the command, in order to confirm the identified intent. Alternatively or additionally, the command generation system 20 may be operative to output information indicating a confidence for each one of several intent classes, quantifying the likelihood that natural language input belongs to that intent class. This information may be output via a user interface, triggering the user to perform a simple selection.

Additional or alternative features may be implemented by the command generation system 20 to determine and/or use confidence information for classifying natural language input in accordance with a set of intents that comprises plural simple intents and plural composite intents. Possible implementation will be described in more detail with reference to FIG. 11 to FIG. 14.

The command generation system 20 may implement an Intent-based Network (IBN). The processing system 20 may be a node of the IBN which may also include other IBN devices (in particular elements of the controlled system) and a data storage. A possible implementation will be described in detail with reference to FIG. 9. Thus, a command generation system implementing an IBN is a command generation system that either forms an IBN or is set up in such a way that is operative to interact with other devices to form the IBN.

As used herein, the terms IBN, intent transaction, and intent supervisor can be construed as follows:

Intent-based Network (IBN): An IBN comprises modules of computer-readable instruction code and/or one or several integrated circuits executing computer-readable instruction code, which receive natural language input, resolve a user's (e.g., network operator's) intent; from such natural language input, and issue command(s) to be executed by an actor of a utility system, industrial system, or communication network. The intent and input relate to tasks that are being performed within the utility system, industrial system, or communication network. Potential intents unrelated to configuration or management tasks of the utility system, industrial system, or communication network. e.g., restaurant reservation, are not contemplated. The concerned controlled system (utility system, industrial system, or communication network) and its elements are said to be "intent-enabled" when integrated with an IBN.

Intent transaction: When a user (e.g., an operator) interacts with the IBN for the first time, a new intent transaction is started for this user. All subsequent intents submitted by the same user (and network commands executed) are part of the same transaction, as long as a termination criterion is not fulfilled. An intent transaction of an operator terminates if:

- A time delay between finishing execution of a previous intent and submission of a new intent is greater than a threshold D
- A user command explicitly requests termination of the current intent transaction
- A user command explicitly requests loading a previous intent transaction state Any two concurrent users have their own and distinct intent transactions.

Intent supervisor: An intent supervisor may be provided in the IBN or command generation system. If provided, the intent supervisor is responsible for continuous monitoring of an intent-enabled controlled system (utility system, industrial system, or communication network) and its elements. The intent supervisor ensures that no previously installed intended state is unintentionally overridden in future, e.g., by unintentional changes in the controlled system as may result from temporary or ongoing failure or faults. For example, an intent may require a 10 Mbps bandwidth path between two endpoints. If any link of that path breaks down or if the available bandwidth of the path goes below 10 Mbps, the intent supervisor can proactively activate an alternative path with at least 10 Mbps bandwidth availability to fulfill the intent. The intent supervisor can access the intent transactions (e.g., a table of intent transactions) in this regard. In addition, when a new intent is submitted and resolved, the intent supervisor can verify whether or not the incoming intent creates any conflict with the network state induced by previously executed intents, if any. Formal verification methods, for instance, can be used in this regard. In case of a conflict, the intent supervisor can be operative to reject the new intent. Otherwise, the intent supervisor can clear the intent for execution. In the latter case, the intent supervisor also verifies that the targeted network state is reached after execution of the commands. The intent supervisor can enforce the self-adaptive nature of an IBN.

User: The term user refers to the person from which the natural language input originates. The user may be an operator or network engineer of the controlled system (utility system, industrial system, or communication network).

Command generation system implementing an IBN: A command generation system having one or several integrated circuits that is or comprises an IBN or that interacts with one or several entities of the controlled system (utility system, industrial system, or communication network) to form an IBN.

Figure 2:
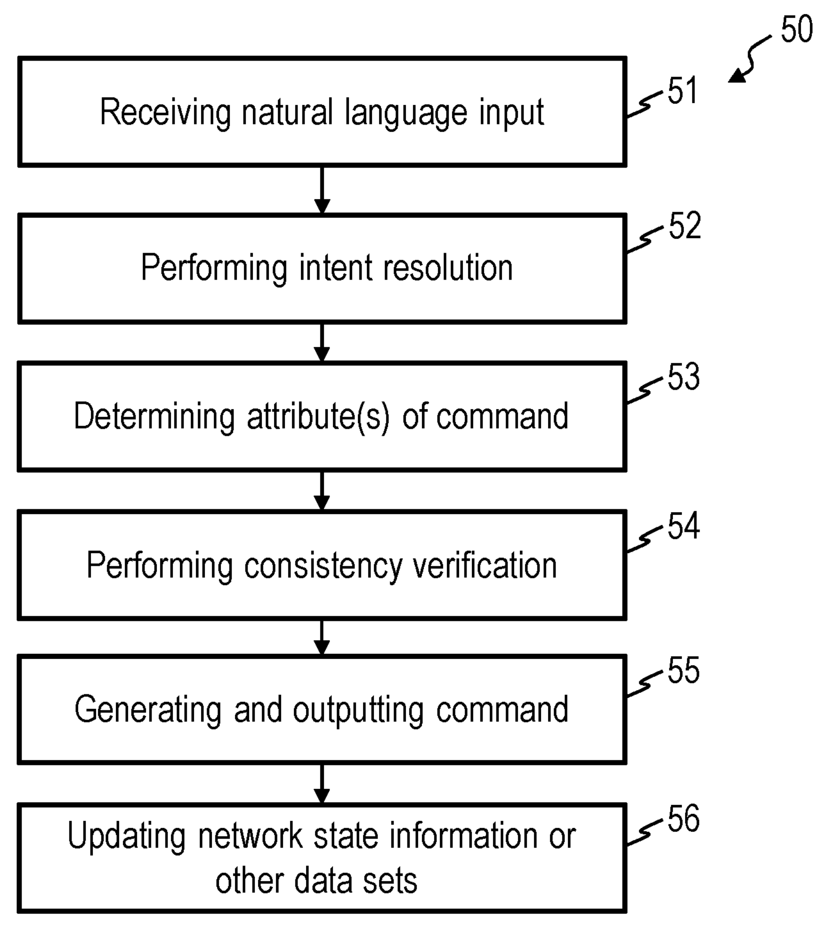
FIG. 2 is a flow chart of a method.

FIG. 2 is a flow chart of a method 50. The method 50 presents a detailed view of a subset of tasks performed by the command generation system 20.

At step 51, natural language input is received. The natural language input may be textual input. Textual natural language input may be received via a web-interface based input interface. The natural language input may be spoken input. Speech-to-text conversion may be performed automatically. The natural language input may be in a language different from a main language used by the NLP- or NLU-based techniques of the command generation system or IBN. Language recognition may be performed on the natural language input. A translation routine may automatically be invoked to translate the natural language input into textual input in the main language (e.g., English) if the natural language input is spoken or textual input in a language other than the main language.

At step 52, an intent resolution is performed. The intent resolution may comprise a classification. The classification may be performed in accordance with a classifier model. The command generation system 20 or IBN may automatically generate the classifier model. The command generation system 20 or IBN may automatically generate composite intents from a set of simple intents stored in a database using NLP- or NLU-based techniques, may train a classifier model using both the simple and the composite intents, and may subsequently use the trained classifier model for processing natural language input and, more specifically, for performing an intent classification.

At step 53, attributes of the command may be determined from the natural language input. The natural language input may specify attributes for the command that may be determined automatically and included in the command that is being generated and output. For illustration, at least some of the intents (such as changing a flow between a first entity and a second entity of the controlled system: or changing a setting of an entity of the controlled system to a new value or by a certain increment or decrement) may include (i) a word or phrase in the natural language input that specifies the action that is to be implemented. (ii) another word or phrase in the natural language input that specifies at least one entity in the controlled system, and/or (iii) yet another word or phrase in the natural language input that specifies a numerical value. For illustration for configuring or reconfiguring a flow path (which may be a data flow path, an energy flow path, or a fluid flow path) between a first node and a second node of a utility grid or communication network, the natural language input may include a word or phrase that specifics the action of configuring or reconfiguring a flow path, another word or phrase that uniquely identifies the first and second nodes, and optional other attributes that govern the flow (such as a data throughput or a power throughput or a fluid flow rate). The command is then generated to include attributes specifying the first and second nodes and attribute(s) specifying flow characteristics.

At step 54, a consistency verification may be performed. The consistency verification may be performed to automatically determine whether a command (that may be defined by a determined intent class and the determined attributes) is to be generated in accordance with the determined intent and/or whether a command generated in accordance with the determined intent is to be output to the actor of the controlled system (i.e., utility system, industrial system, or communication network). The consistency verification may comprise receiving a user input responsive to outputting a result of the intent resolution for user confirmation. The consistency verification may comprise verifying that the determined intent is consistent with previously identified intents. The previously identified intents may include intents identified from natural language input of several distinct users. The previously identified intents may be retrieved from a database in which they are stored in response to execution of the command(s) generated based on the previously identified intents. The consistency verification may comprise verifying that the determined intent is consistent with previously issued commands. The previously issued commands may be retrieved from a database in which they are stored in response to execution of the commands. The consistency verification may comprise verifying that the determined intent is consistent with a state of the controlled system (i.e., the utility system, industrial system, or communication network). State information of the state of the controlled system may be retrieved from a database that may be located within the controlled system or separate therefrom, directly from the one or several entities of the controlled system, and/or from a database maintained locally by the command generation system 20 or IBN.

At step 55, a command may be generated in accordance with the determined intent. The command may be generated based on the intent determined by intent resolution, which may be defined by one or several identifiers for one or several intent classes. For illustration, look-up techniques may be used to determine, based on the intent determined by intent resolution and based on information on the interface (s) of the actor to which the command is being output, which command is to be output. The command may be generated based on attributes determined from the natural language input. The generation of the command at step 55 and/or the outputting of the command at step 55 may be performed selectively depending on a result of the verification at step 54.

At step 56, in response to confirming that the command has been executed to implement the action specified by the natural language input, the command generation system 30 or IBN may update a data set that specifies the determined intents, the executed commands and/or the network state obtained in response to execution of the commands.

Figure 3:
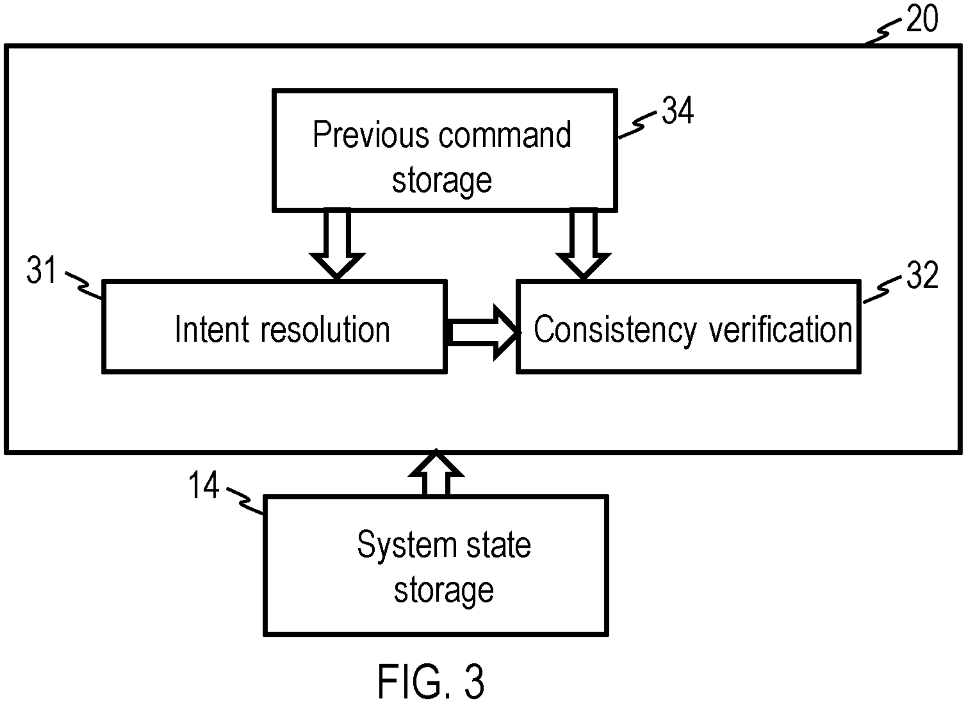
FIG. 3 is a schematic representation of a command generation system.

FIG. 3 is a block diagram of the command generation system 20. The command generation system may comprise or may be communicatively coupled to a command storage system 34 that stores previously issued commands.

The command generation system 20 may include or may be communicatively coupled with a system state storage system 14. The system state storage system 14 may be resident within the controlled utility system, industrial system, or communication network.

The consistency verification module 32 may retrieve information on previously output commands from the command storage system 34 and/or a state information that defines at least part of a state of the controlled system (utility system, industrial system, or communication network) from the system state storage 14.

The consistency verification module 32 may be operative to verify that an intent determined by the intent resolution module 31 is consistent with the previously issued commands. The previously issued commands may be retrieved from the command storage system 34 in which they are stored in response to execution of the commands.

The consistency verification module 32 may be operative to verify that an intent determined by the intent resolution module 31 is consistent with a state of the controlled system (i.e., the utility system, industrial system, or communication network). The state information of the state of the controlled system may be retrieved from the system state storage 14 that may be located within the controlled system or separate therefrom.

Consistency verification may include (1) verifying whether or not the incoming intent creates any conflict with the network state induced by previously executed intents and (2) verifying that the targeted network state is reached after execution of the commands.

Not only the consistency verification, but also the intent resolution may be dependent on the previously issued commands and/or the current state of the controlled system. For illustration, information on previously issued commands and/or information on the current state of the controlled system may be used in a classification procedure that classifies the natural language input to belong to one of several intent classes. The classifier model may receive both information on one or several previously issued commands and/or information on at least one parameter of at least one device of the controlled system as input, in order to perform the intent classification.

Figure 4:
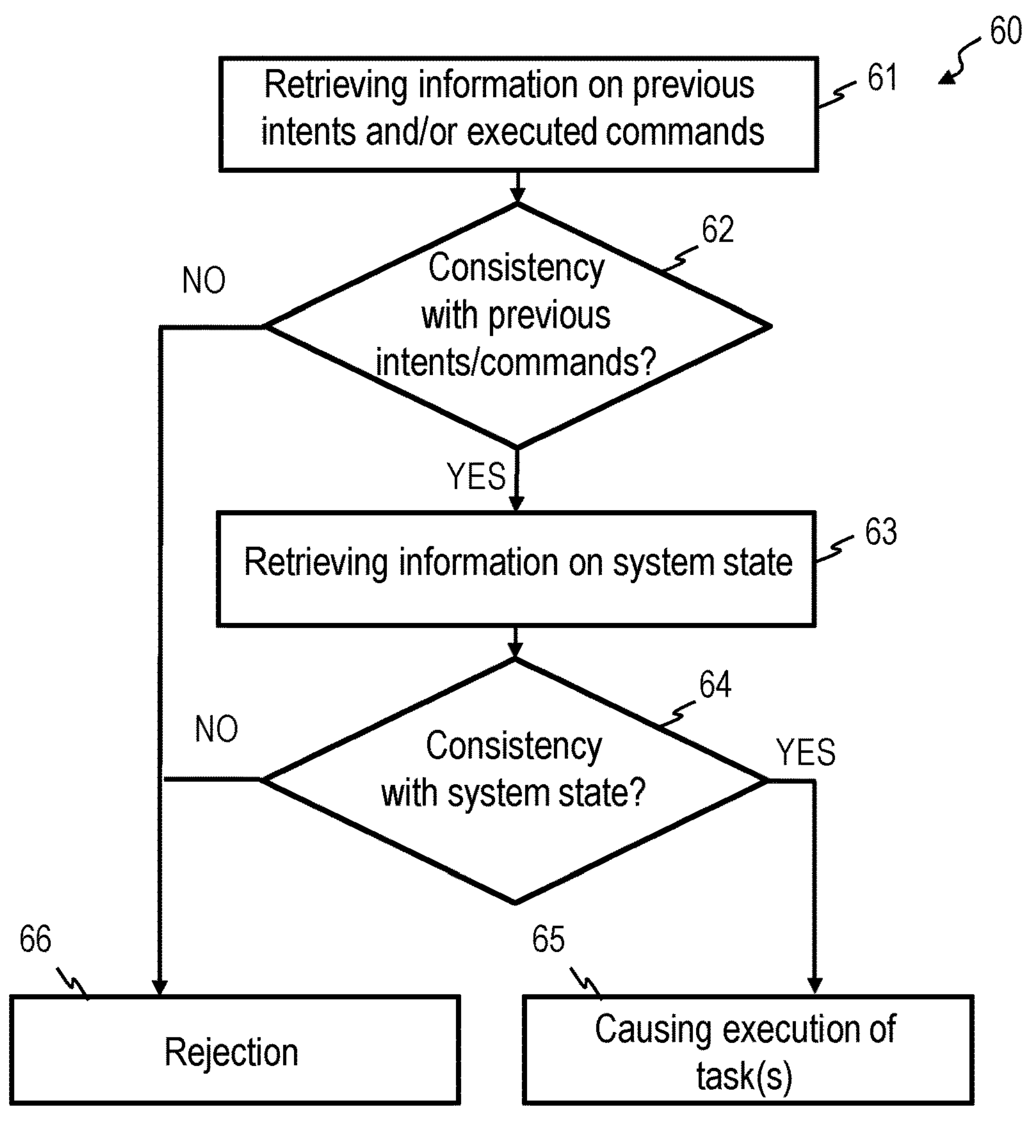
FIG. 4 is a flow chart of a method.

FIG. 4 is a flow chart of a method 60. The method 60 may be performed to implement the consistency verification step 54 of FIG. 2. The method 60 may be performed automatically by the consistency verification module 32.

At step 61, information on previously identified intents and/or previously executed commands is retrieved. Retrieval of this information may be triggered by receipt of the natural language input. The information may be retrieved from a database within the IBN.

At step 62, it is determined whether an intent determined by intent resolution from the natural language input is consistent with the previously identified intents and/or previously executed commands. If an inconsistency is determined, the natural language input is rejected at step 66. Step 66 may comprise outputting information (such as an alert, warning, or other signal) via a user interface (UI). The information may indicate that the natural language input has been rejected. The information may indicate a reason for rejecting the natural language input, such as an indication of a previously identified intent, and/or previously executed command that conflicts with the intent.

At step 63, information on a state of the controlled system (utility system, industrial system, or communication network) is retrieved. The retrieval of the information at step 63 may be triggered by receipt of the natural language input. The information on the state of the controlled system may be retrieved from a control or management center within the controlled system or from a database that is maintained separately from the controlled system.

At step 64, it is determined whether or not a projected state of the controlled system (utility system, industrial system, or communication network) based on the input intent is consistent with the desired (intended) state of the controlled system. If an inconsistency (i.e., a conflict) is determined, the natural language input is rejected at step 66. Step 66 may comprise outputting information (such as an alert, warning, or other signal) via the user interface (UI). The information may indicate that the natural language input has been rejected. The information may indicate a reason for rejecting the natural language input, such as an indication of a system state of the controlled system that conflicts with the intent.

At step 65, if the determined intent is consistent with the previously identified intents, the previously executed commands, and a current state of the controlled system, execution of the tasks specified by the natural language input may be triggered. This can involve triggering the command generation module 33 to generate and output the command in accordance with the determined intent class and the identified attributes.

While the method 60 of FIG. 4 shows various checks that confirm that there is no conflict with previous intents or commands or with the system state, not all of these steps need to be performed in combination. For illustration, steps 63 and 64 are optional when the controlled system has a central control or management system with which the command generation system is interface. Steps 63 and 64 may beneficially be used when the controlled system has a distributed control.

Operation of the method 60 without having to execute steps 63 and 64 is explained below with reference to non-limiting examples (i). (ii). (iii), and (iv). The method 60, be it with or without steps 63 and 64, may be implemented for various other commands and/or various other controlled systems, without being limited to the examples:

(i) A first user has submitted the following intent: allow 10 Gbps flow between 10.0.0.1 and 10.0.0.2 for the next 24 hours, and this intent has been successfully installed in the network. A second user submits the following further intent thereafter and within the 24-hour time window: restrict the flow from 10.0.0.1 to 10.0.0.2 to 1 Gbps. It will be determined that the further intent violates the network state intended by the first user. The IBN can reject this further intent without having to consult the network state table.

(ii) A first user has submitted the following intent: allow 10 Gbps flow between 10.0.0.1 and 10.0.0.2 for the next 24 hours, and this intent has been successfully installed in the network. A second user submits the following further intent thereafter and within the 24-hour time window: remove the flow from 10.0.0.1 to 10.0.0.2. It will be determined that the further intent violates the network state intended by the first user. The IBN can reject this further intent without having to consult the network state table.

(iii) The controlled system is a fluid utility grid or an industrial (e.g., chemical) plant having a fluid pump. A first user has issued an intent to set a volume flow rate in a pump to 1 to 100 cubic meter per unit time. At a later time, a second user issues another intent to set the flow rate in the same pump 1 to 10 cubic meter per unit time. The IBN will recognize this as a violation of the state intended by the first user. Therefore, the IBN can immediately reject the second user's intent without requiring it to consult the detailed system state stored in the database. 35

(iv) The controlled system is an electric power system having sources (such as distributed energy resources (DERs)) and/or battery energy storage systems (BESSs). A first user has issued an intent to set a power production by a DER and/or a power storage by a BESSs to be within a first range for a first time period. At a later time and within the first time period, a second user issues another intent to set the power production by the DER and/or the power storage by the BESSs to be within a second range that has at least one boundary different from the first range. The IBN will recognize this as a violation of the state intended by the first user. Therefore, the IBN can immediately reject the second user's intent without requiring it to consult the detailed system state stored in the database.

In other embodiments, steps 61 and 62 are optional.

At least one classifier may be executed to assign natural language input to an intent class. The classifier may be operative to assign the natural language input to a set of intent classes, with the set comprising plural intent classes associated with simple intents and plural intent classes associated with composite intents.

Figure 5:
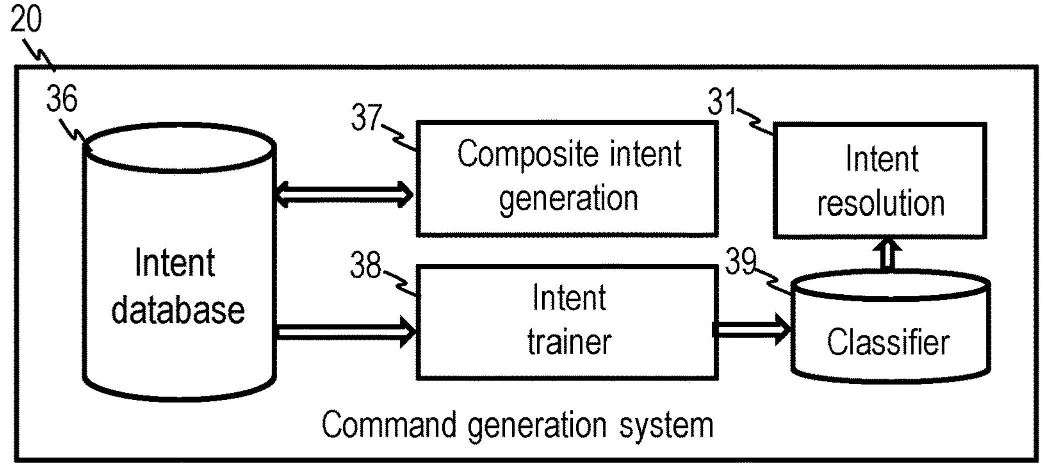
FIG. 5 is a schematic representation of a command generation system.

FIG. 5 is a block diagram of the command generation system 20. The command generation system may comprise or may be communicatively coupled to an intent database 36. Initially, the intent database may store at least a set of simple intents. The simple intents may include simple intents that are persistently stored and/or simple intents specified by a user. The simple intents may depend on the type of the network that is being controlled. For illustration, different sets of simple intents may be used depending on whether the command generation system 20 is intended to implement an IBN for issuing commands to an electric power system, to a fluid grid, to an industrial manufacturing system, or to a communication network. The different sets may be stored concurrently in the intent database 36, and one of the different sets may be accessed depending on which type of system (e.g., electric power system, fluid grid, industrial manufacturing system, communication network) is to be controlled by the command generation system 20.

The command generation system 20 may comprise a composite intent generation module 37. The composite intent generation module 37 may be operative to retrieve simple intents from the database 36. The composite intent generation module 37 may be operative to generate composite intents from the simple intents. Each composite intent may be composed of two or more than two simple intents. The composite intent generation module 37 may be operative to apply natural language processing (NLP)-techniques to generate composite intents from simple intents. The composite intent generation module 37 may be operative to store the generated composite intents in the intent database and/or output the generated composite intents to the intent trainer 38.

The composite intent generation module 37 may access simple intents in the intent database 36 that depend on which type of system (e.g., electric power system, fluid grid, industrial manufacturing system, communication network) is to be controlled by the command generation system 20.

The NLP rules applied by the composite intent generation module 37 to generate composite intents from simple intents may depend on which type of system (e.g., electric power system, fluid grid, industrial manufacturing system, communication network) is to be controlled by the command generation system 20. For illustration, different NLP-based rule sets may be used for generating composite intents depending on whether an electric power system, a fluid grid, an industrial manufacturing system, or a communication network is to be controlled by the command generation system 20.

The command generation system 20 may comprise an intent trainer 38. The intent trainer 38 may be operative to retrieve simple intents from the intent database 36 and to retrieve composite intents from the intent database 36 and/or receive the composite intents from the composite intent generation module 37. The intent trainer 38 may be operative to use the retrieved simple and composite intents to train a classifier model 39.

The intent trainer 38 may apply NLP, natural language understanding (NLU), and machine learning classification techniques to generate an intent classification model.

The intent classification model 39 may be operative to receive natural language input as input and assign the natural language input to at least one input class. Each of the input classes into which natural language input can be classified may comprise to one of the simple and composite intents.

The intent classification model 39 may be a machine learning (ML) model. The intent trainer 38 may be operative to perform training of the intent classification model 39. Supervised techniques (such as supervised ML) may be used. Alternatively or additionally, the intent trainer 38 may be operative to implement a generative adversarial network (GAN) architecture to train the intent classification model 39. The intent trainer 38 may execute a generator that is trained to generate candidates for the classifier model (which may be a neural network, without being limited thereto) and a discriminator that is trained to assess the candidates. When the performance of the intent classification model 39 meets a termination criterion (such as a performance threshold criterion and/or a time-out criterion), training of the classifier model 39 may be terminated.

The command generation system 20 or IBN can maintain an intent transactions table to keep track of the ongoing and past intents submitted by any user and/or executed in the controlled system. An intent transaction. e.g., T(u, t) for user u at time t, records the list of intents submitted in a given session initiated by a user with the IBN interface, commands executed, and/or changes (such as power, fluid, and/or communication flows) affected in the controlled system. For example, a given intent transaction can store, for each intent in it, flow identifiers (unique positive integers) of the affected flows, from which various related parameters can be determined. Examples of such related parameters include endpoints, path, bandwidth, and latency. Each T(u, t) is identified with a unique positive number, which can be alphanumeric.

The intent transaction can help to resolve complex network intents, as will be described in more detail below.

Figure 6:
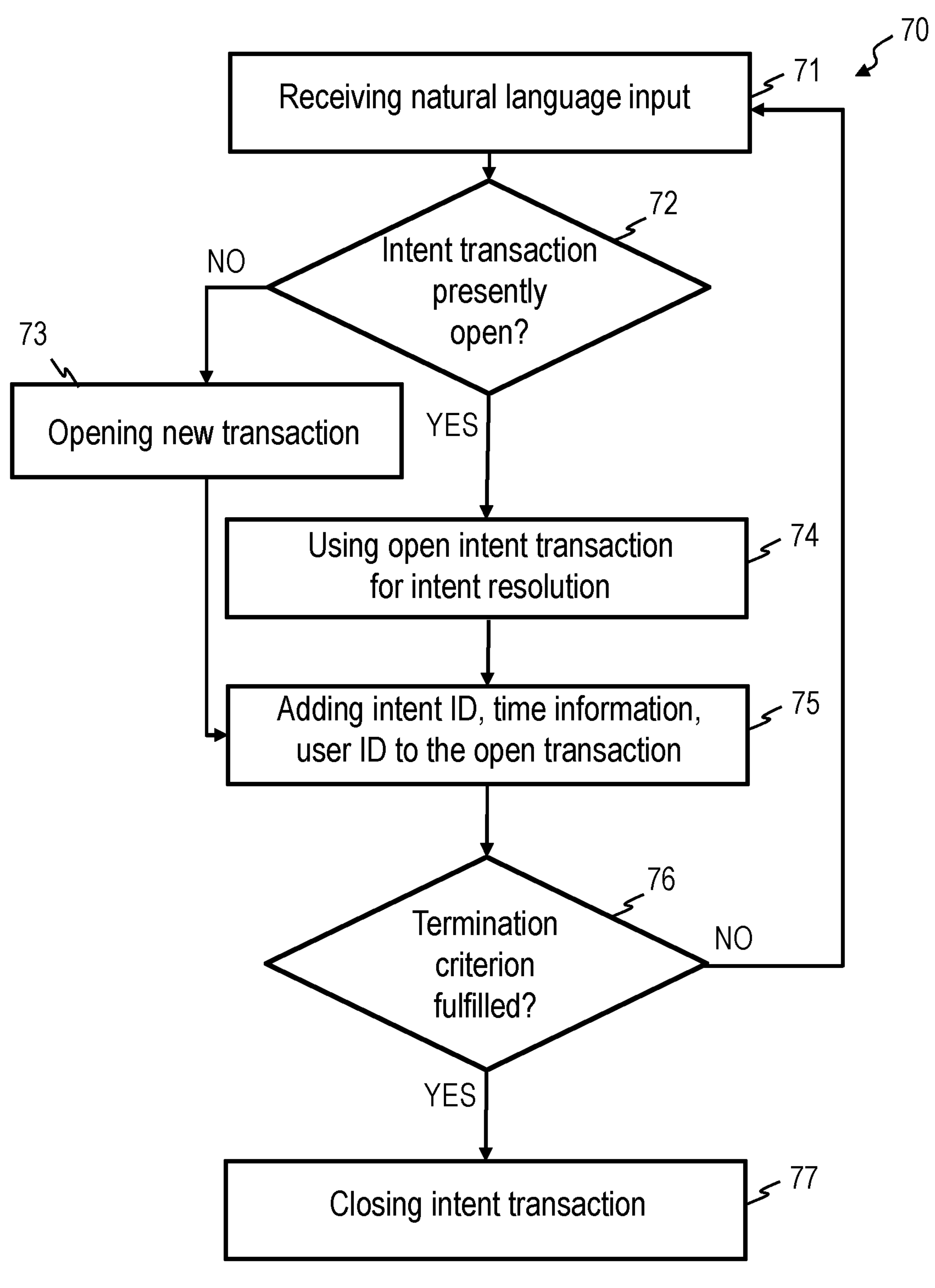
FIG. 6 is a flow chart of a method.

FIG. 6 is a flow chart of a method 70. The method 70 may be performed automatically by the command generation system 20 or IBN implemented by the command generation system 20.

At step 71, natural language input is received from a user. The user may be identified using his/her logon information to the command generation system or other authentication techniques that provide a unique identifier for the user.

At step 72, it is determined whether an intent transaction is present open for the identified user.

At step 73, a new intent transaction is opened if no intent transaction is presently open for the user. The method proceeds to step 75.

At step 75, when an intent transaction is open for the user, the intent transaction may be used to perform intent resolution of the received natural language input.

At step 76, it is determined whether a termination criterion is fulfilled. The termination criterion may comprise any one or any combination of a time threshold criterion, receipt of a command for terminating the intent transaction, receipt of a command to load a previous intent transaction. If the termination criterion is not fulfilled, the method may return to step 71. Additional natural language input received from the same user is added to the same intent transaction.

At step 77, if the determination criterion is fulfilled, the intent transaction is closed. The closed intent transaction may be stored and retrieved upon request. For illustration, a user may request a closed intent transaction to be loaded when inputting new natural language input that causes the generation of commands.

Plural intent transactions associated with plural different users may be concurrently open. For illustration, the command generation system 20 or IBN may be operative to maintain and use a first open intent transaction associated with a first user concurrently with maintaining and using a second open intent transaction associated with a second user different from the first user.

Figure 7:
FIG. 7 is a representation of an implementation of an intent transaction table.

FIG. 7 shows an implementation of an intent transaction 80. An intent transaction may include or consist of a data structure that represents a table. The intent transactions table may inter alia include timing information. e.g., in the form of a timing table. The timing table may contain data, as shown in FIG. 7, stored using either a relational database management system (RDBMS) or a key-value data store.

The timing table contains a table of data for each intent transaction. These data include a unique transaction identifier, intent identifier of each intent in the said transaction, intent submission and completions times, and the resultant network state.

As shown in FIG. 7, when an intent (for illustration I_1) under transaction T_1, is submitted to the command generation system 20 or IBN, a row in the concerned table is created. Here, t_1_0 indicates the time when I_1 is received, whereas t_1_1 indicates the time when the said intent reached a "finished" state in which it has been executed. S(T_1, I_1) denotes the state of the controlled system (utility system, industrial system, or communication network) attained at that stage. Since all intent transactions are uniquely identified. T_1 also carries information indicating the user (e.g., the system operator) who initiates that particular intent transaction.

For further illustration, it is assumed that intent I_(j+1) is submitted at time t_(j+1)_0. The intent I_(j+1) may be considered part of the ongoing transaction T_1 only if a time threshold criterion is fulfilled. For illustration, the time lapsed from execution of the preceding intent (t_(j+1)_0−t_j_1) may be computed and may be subject to a threshold comparison. The intent I_(j+1) submitted at time t_(j+1)_0 may be included in the ongoing intent transaction T_1 only if t_(j+1)_0−t_j_1<D. To evaluate this, when any intent reaches the "finished" state, the command generation system 20 or IBN may start a transaction timer. If the transaction timer value exceeds D without having another intent submitted by the same user, the user's current intent transaction is terminated. If the user submits a new intent after this period, a new intent transaction is initiated for that user. Terminating intent transaction of a user does not affect the ongoing intent transactions of other users, if any. The transaction timer is unique to a given transaction. Two different intent transactions will have two different transaction timers.

The threshold value D may be dependent on activities in the controlled system. The threshold value D may be dependent on state information retrieved from the controlled system. The threshold value D may be user-specific or may be the same for all users.

Figure 8:
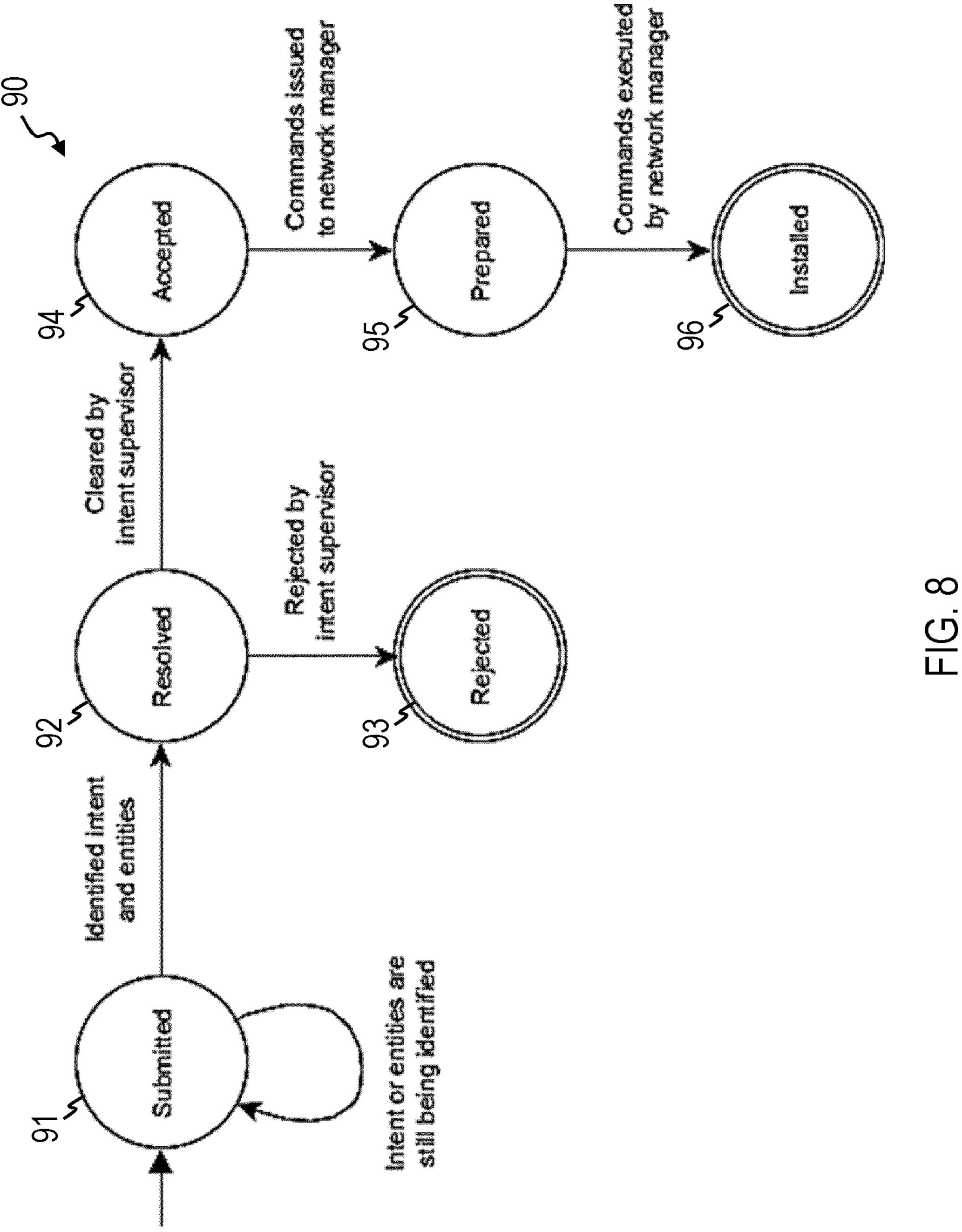
FIG. 8 is a state diagram of a command generation system implementing an Intent-based Network.
Figure 9:
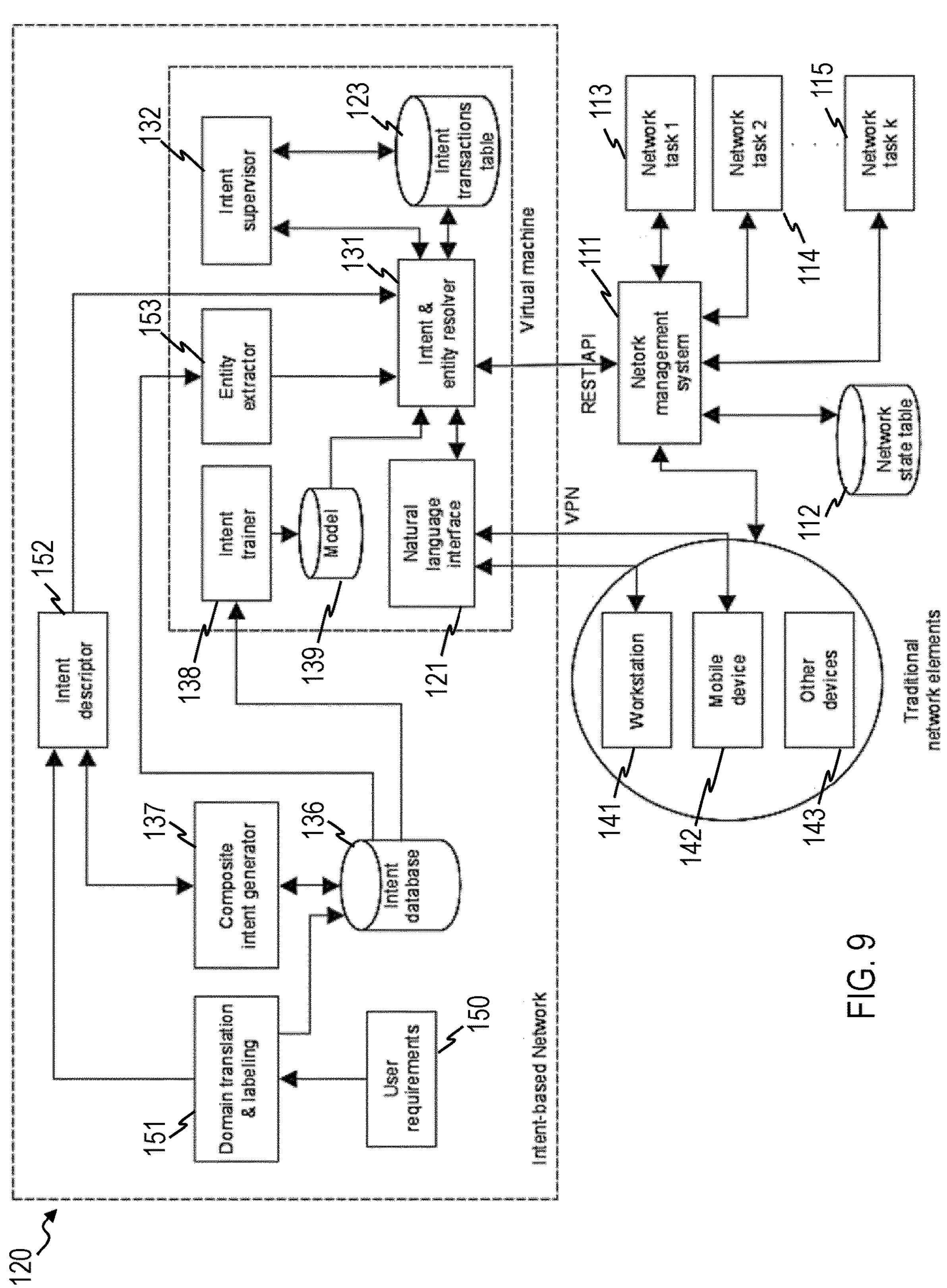
FIG. 9 is a schematic representation of a command generation system coupled to a user input device and a controlled system.

FIG. 8 illustrates the state machine for processing a new intent included in natural language input. As shown in FIG. 9, when natural language input indicating an intent is submitted, the intent is in a "submitted" state 91. The command generation system or IBN identifies the corresponding intent class, and, if present, extracts the relevant attributes (such as entities of the controlled system specified by the natural language input) from the natural language input.

The intent then moves to the "resolved" state 92, in response to identification of the intent class and, if present, associated attributes.

An intent supervisor verifies whether or not application of this intent will violate the state of the controlled system induced by past intents. In case a violation is predicted, the intent is moved to a "rejected" state 93. Alternatively or additionally, an intent can be rejected when the resources of the controlled system do not allow to fulfill it. For illustration, for a controlled system that is a communication network, a user may request a 100 Gbps path, whereas only 1 Gbps is feasible, which leads to rejection of the intent.

When not rejected, the intent moves into the "accepted" state 94. Subsequently, the IBN instructs an actor in the controlled system (such as an NMS of a communication network) to execute a set of commands corresponding to the accepted intent. The intent is then "prepared" for execution ("prepared" state 95). When the actor of the controlled system confirms that the execution of the commands is complete, the intent supervisor verifies this and moves the intent to the "installed" state 96.

FIG. 9 shows a detailed block diagram of an embodiment. While the embodiment is explained in association with a controlled system that is a communication network, and actor in the controlled system that is an NMS, and exemplary input devices for inputting the natural language input, the embodiments are not limited thereto. For illustration, the controlled system may be a utility system or an industrial system. The actor in the controlled system may be a control or management system other than an NMS, such as a substation control or management center, a regional control or management center, or another control or management entity.

In FIG. 9, an IBN 120 complements a controlled system via an NMS 111. The network may comprise various networking elements, such as multiservice platforms, routers, switches, and hosts. Network hosts can be workstations using wireline and wireless connections. Network hosts can also be hand-held mobile devices, such as tablets and smartphones, that connect over a virtual private network (VPN).

Preparing the IBN 120 for Processing Natural Language Input in Field Use

Users (including operator(s), without being limited thereto) submit network intent data 150 to the IBN 120, which are labeled by domain experts 151. For example. "create a flow between 10.0.0.1 and 10.0.0.2" and "allow a1:b2:c3:d4:e5:f5 and aa:bb:cc:dd:cc:66 to communicate" both belong to the same intent class. e.g. to create_unicast_flow. In addition, all relevant network entities are also labeled. For instance, in the first example. "10.0.0.1" and "10.0.0.2" are network entities of interest. All labeled examples are added to an intent database 136. The domain translation and labeling may be performed by a domain translation and labeling module 151. Additionally, an intent descriptor 152 is created, which stores metadata about intents, such as the name of an intent, the mandatory and optional entities required by it, and so on.

Intents entered by users (including operator(s) and/or network engineers, without being limited thereto) are typically "simple" intents. i.e., they relate to one small (atomic) unit of any network-related task. The composite intent generator module 137 uses NLP techniques to combine two or more simple intents to form a composite intent. In particular, a k-composite intent is composed of k simple intents (k>1). For instance. "create a flow between 10.0.0.1 and 10.0.0.2" and "allow HTTPS traffic" are two simple intents. Conjunctions, infinitives, n-gram sequences, and/or other NLP techniques can be used to generate such composite intents. For example. "create a flow between 10.0.0.1 and 10.0.0.2 and allow HTTPS traffic" is a 2-composite intent formed using conjunction. Such composite intents are labeled with composite intent classes and are added both to the intent database 136 and the intent descriptor 152. In case of composite intents, the intent descriptor 152 also records the simple intent classes that form a given composite intent class. FIG. 10 illustrates some intents and metadata stored in the intent descriptor, in the form of a table 180.

When enough examples for each intent class are available in the database, the intent trainer module 138 applies NLP, natural language understanding (NLU), and/or machine learning classification techniques to generate an intent classification model 139. In addition, machine learning may also be used to extract network entities from the intent examples. For example, the intent "create a flow between 10.0.0.1 and 10.0.0.2" consists of two network entities. "10.0.0.1" identified as "source" and "10.0.0.2" identified as "target." Consequently, given a network intent, the IBN 120 can identify the corresponding intent class and required entities.

Processing Natural Language Input in Field Use of the IBN 120

The IBN 120 provides a natural language interface, where users (in particular operators) can type in their network intent in natural language and submit via an input device 141, 142, 143. The input device 141, 142, 143 may be a portable device or a mobile device. The input device 141, 142, 143 may offer a simple textual or speech interface that allows a user to cause, via the IBN, changes in the controlled system, without having to navigate through a menu of graphical user interface of the NMS 111 and/or without requiring knowledge of the interface of the NMS 111, its commands, and/or a current state of the controlled system.

The IBN 120 receives the natural language input via a first interface 121, which is a natural language interface.

An intent and entity resolver module 131 is responsible for classifying any input intent. The intent and entity resolver module 131 may perform a classification in accordance with the classification model 139 that has previously been trained by the intent trainer 138.

The intent and entity resolver module 131 may be operative to assign a classification confidence value (between 0 and 1, both inclusive) to all the known intent classes. For example, the intent "create a flow from host1 to host2" may have a high confidence value for the create_unicast_flow intent class, but low confidence values for the other intent classes.

Since two similar input texts can belong to two different intent classes, an ambiguity can arise during the classification process. To address this, the intent classification confidence values are considered and used. For illustration, as will be explained in more detail with reference to FIGS. 11 to 14, the IBN 120 may construct a classification tree, identify a path with the highest positive confidence score. The intent at the root of the path (or sub-path) is most likely the target intent. This can be confirmed with the user's feedback.

The IBN 120 compares the extracted entities, if any, from a user's input intent are compared with the (possibly empty) list of entities expected by the concerned intent class. This provides various effects. First, when considered together with the classification confidence values, the percentage of expected entities that are identified can help to further disambiguate the target intent class. Second, the IBN 120 may prompt the user, via the input device 141-143, to input the remainder of the expected entities, if any.

In addition, artificial intelligence (AI) techniques, such as ontology and descriptive logic, can be used to infer conceptual equivalence of network entities. For example, an intent to create a unicast flow requires two entities, source and target. However, the IBN may identify the two entities as "source" and "enpoint1." AI can be used here to derive the equivalence between "endpoint1" and "target." An exemplary network ontology will be described in more detail with reference to FIG. 16.

When the target intent and actions are confirmed by the user, an intent supervisor 132 considers the potential effect of applying the intent. In particular, the intent supervisor 132 verifies whether or not the new intent would move the network into a state that violates the state induced by the previously installed intents. In case such a violation is predicted, the intent is rejected. Otherwise, the IBN 120 processes the intent.

With the intent class and entities known, the intent and entity resolver module 131 of the IBN 120 communicates with the NMS 111 and issues appropriate commands. The NMS 111, in turn, triggers network tasks (which may be computer-executable instructions) to achieve the user's desired operation. A network task can be a command or a program to achieve a small, unique task. e.g., allocate a new flow between two endpoints by installing rules in switches. When all tasks are executed, the NMS 111 captures and communicates the network state to the intent supervisor.

In addition, the above-described intent resolution process is stateful. The IBN 120 maintains states of intents and network commands. A network state table 112 may keep record of the contemporary and past network states. Such a network state table 112 may be part of the controlled network and not of the IBN system 120. A network state. e.g., S(t) at time t, can be represented with a combination of various parameters, such as the active virtual network functions (VNFs) and their loads, the range of IP addresses assigned, flow details, and network utilization. When the network manager 111 triggers a network task, commands within the controlled network may be conditioned by the network state table 112. The intent supervisor 132 may access and use the information in the network state table 112 to determine whether an intent is to be executed.

The IBN 120 maintains intent transaction information 123. The intent transaction information 123 may be or may include an intent transaction table, as explained above. The intent transaction information 123 can be maintained to keep track of the ongoing and past intents submitted/executed by any user (e.g., any operator). An intent transaction. e.g., T(u, t) for operator u at time t, records the list of intents submitted in a given session initiated by an operator with the IBN interface, network commands executed, and flows that get affected among others. For example, for (data or power or fluid) flow control, a given intent transaction can store, for each intent in it, flow identifiers (unique positive integers) of affected flows, from which various related parameters, such as endpoints, path, bandwidth (or throughput), and latency, can be known. Each T(u, t) is identified with a unique positive number, which can be alphanumeric.

The current intent transaction can help to resolve complex network intents. For example, an exemplary natural language input could be "create a flow between 10.0.0.1 and 10.0.0.2 and allocate 100 Mbps bandwidth." It is evident that the intent in this example is that only the flow between 10.0.0.1 and 10.0.0.2 should get 100 Mbps bandwidth, not all the flows in the network. In contrast, consider the scenario where an operator submits the following two intents separately, one after another, with a delay less than D:

(a) create a flow between 10.0.0.1 and 10.0.0.2

(b) allocate 100 Mbps bandwidth

The IBN 120 can resolve intent (a) and process it. However, without additional information, the IBN 120 would be unable to resolve (or might be prone to wrongly resolve) intent (b). The context acquired in the current transaction (i.e., flow between 10.0.0.1 and 10.0.0.2) after processing intent (a) can be used to aid in the resolution of the later-submitted intent (b).

Continuing this illustrative example, the following intent may be submitted with a delay greater than D since the completion of execution of intent (b):

(c) remove the last allocated flow

In this case, due to transaction time out, a new intent transaction is initiated for the operator. Since all transactions are stored in the intent transactions table 123, the intent and entity resolver 131 can retrieve the flow identifier (say F101)

from the previous transaction and ask the user who submitted the intent (c) whether F101 is to be removed.

With reference to FIG. 9, the intent database 136 and the intent descriptor 152 may reside in the controlled system or in a commercial cloud. In such a case, the virtual machine, shown with dashed outline in FIG. 9, as well as the intent database 136 and the intent descriptor 152 together form the IBN 120. Alternatively, the intent database 136 and intent descriptor 152 may both be included in the virtual machine. In such a case, the virtual machine and its contents form the IBN 120. In either case, the virtual machine with IBN instruction code can be hosted as a guest in a physical system. In other embodiments, it is not required that virtualization techniques be used to implement the IBN.

A primary and a backup network path can exist between the IBN 120 and the NMS 111. The controlled system may have a backup NMS (not shown in FIG. 9). Another primary and another backup network path can exist between the IBN 120 and a backup NMS (not shown in FIG. 9).

Intent Class Identification

Information that quantifies the probability of a natural language input belonging to an intent class may be determined for each of the intent classes. The information that quantifies the probability may be determined in accordance with a metric. The information that quantifies the probability may be used for various purposes, such as automatically determining a most plausible classification, determining whether a user confirmation is required, and/or selecting several candidate intent classes for outputting to the user when requesting a user confirmation.

Figure 11:
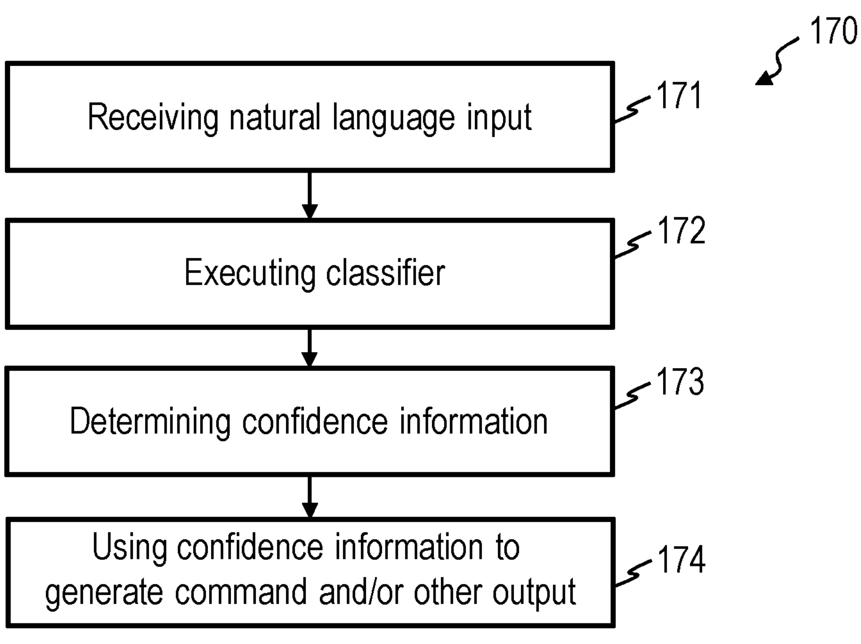
FIG. 11 is a flow chart of a method.

FIG. 11 is a flow chart of a method 170. The method 170 may be performed by the command generation system 20 or IBN.

At step 171, natural language input is received.

At step 172, a classifier may be executed to perform an intent classification, in which the natural language input is assigned to at least one intent class. The intent resolution may comprise classifying the natural language input into intent classes. More than one possible intent class may be identified.

At step 173, confidence information is determined. The confidence information may be determined when performing the intent classification. The confidence information may be indicative of a metric that quantifies probability that the natural language input is associated with the respective intent class. The confidence information may be determined by the classifier when performing the classification. The confidence information may be obtained by re-running the classifier several times and determining statistical information on the results. This applies in particular when the classifier employs non-deterministic techniques. The confidence information may be obtained by further processing of classification confidence values. For illustration, a confidence tree may be constructed and a path confidence may be determined for each of plural paths through the confidence tree, as will be explained in more detail with reference to FIG. 12 to FIG. 14.

At step 174, the confidence information is used to generate output. Depending on whether the confidence information for any one of the intent classes meets a confidence threshold criterion, a command may be generated and output to the actor in the controlled system without requiring a user confirmation. For illustration, the command may be generated and output to the actor in the controlled system without requiring a user confirmation when the confidence information for one intent class is equal to or greater than a first confidence threshold. When output via a user interface is generated to request user confirmation, a selection of candidate intents that are presented to the user for confirmation may be based on the confidence information. For illustration, all candidate intents that have a confidence information equal to or greater than a second confidence threshold may be output to the user for selection. The second confidence threshold may be less than the first confidence threshold.

Figure 12:
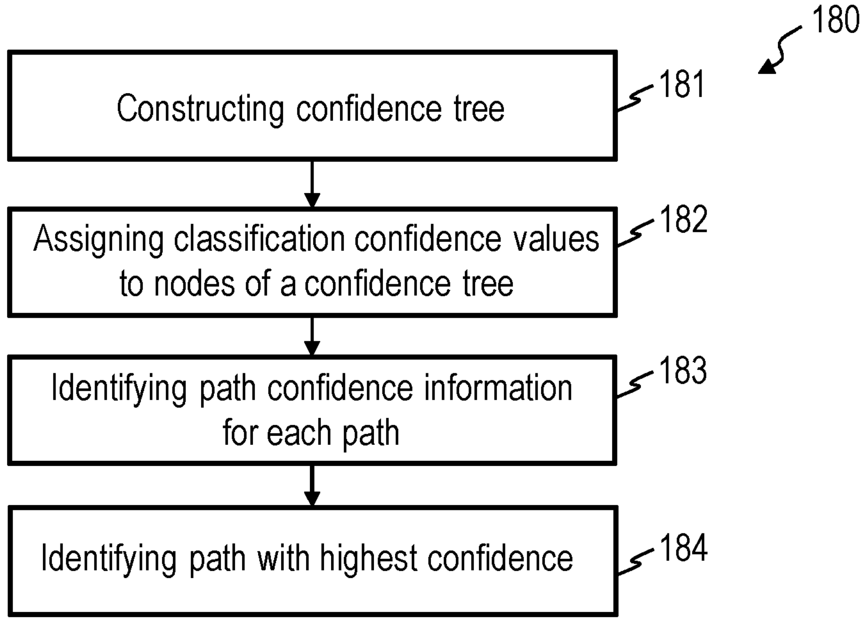
FIG. 12 is a flow chart of a method.

FIG. 12 is a flow chart of a method 180. The method 180 may be performed by the command generation system 20 or IBN. The method 180 may be implemented to determine the confidence information at step 173. The method 180 includes generating a data structure representing a tree having nodes and links, and determining a path through the tree.

Each node of the confidence tree may be associated with (only) one of the plurality of simple intents or one of the plurality of composite intents.

The confidence tree may comprise at least one node associated with one of the plurality of composite intents and at least two nodes each associated with simple intents selected from the plurality of simple intents.

A node of the confidence tree associated with one of the plurality of composite intents may have child nodes that are associated with composite or simple intents from which the one of the plurality of composite intents is formed.

Determining the confidence information that quantifies reliability of classification results for different intent classes may comprise identifying a path through the tree from among all possible paths through the tree based on confidence values assigned to nodes and/or links of the confidence tree.

At step 181, the confidence tree may be constructed. The confidence tree may have a root node that is associated with an n-composite intent, with n being an integer and $n \geq 2$. Any node in the confidence tree other than leaf nodes may be associated with a composite intent. Any node other than the leaf nodes may have plural child nodes. Any node associated with a k-composite intent (with k being an integer $n \geq k \geq 2$) may have k child nodes, each of which is associated with a $(k-1)$ composite intent (with the $(k-1)$ composite intents of all child nodes being different from each other).

At step 182, confidence values obtained by the intent classification may be assigned to each node. The confidence values may be the classification confidence that the natural language input belongs to the simple or composite intent class of the respective node.

At step 183, a confidence for a path through the confidence tree is determined. Step 183 may be performed iteratively for each possible path.

This may be done by a process that includes (i) starting at a leaf node that has a positive (i.e., non-zero) confidence value, (ii) moving up to the ancestor node, (iii) repeating step (ii) until the ancestor node has zero confidence value, (iv) determining a confidence for the respective path through the confidence tree by multiplying all positive confidence values found along this path.

The process may be repeated for each of the leaf nodes.

At step 184, the path with the highest path confidence is determined.

The path confidence for the path with the highest path confidence, optionally also the path confidences of other paths, may be used to generate output. Depending on whether the path confidence meets a path confidence threshold criterion, a command may be generated and output to the actor in the controlled system without requiring a user confirmation. For illustration, the command may be generated and output to the actor in the controlled system without requiring a user confirmation when the path confidence for one (simple or composite) intent class is equal to or greater than a first path confidence threshold. When output via a user interface is generated to request user confirmation, a selection of candidate (simple or composite) intents that are presented to the user for confirmation may be based on the path confidence information. For illustration, all (simple or composite) candidate intents that have a path confidence equal to or greater than a second path confidence threshold may be output to the user for selection. The second path confidence threshold may be less than the first path confidence threshold.

The root node's child with the highest confidence is most likely the desired intent class. However, the zero-confidence node (or its ancestors) can also be the desired intent. A user confirmation may be performed.

Figure 13:
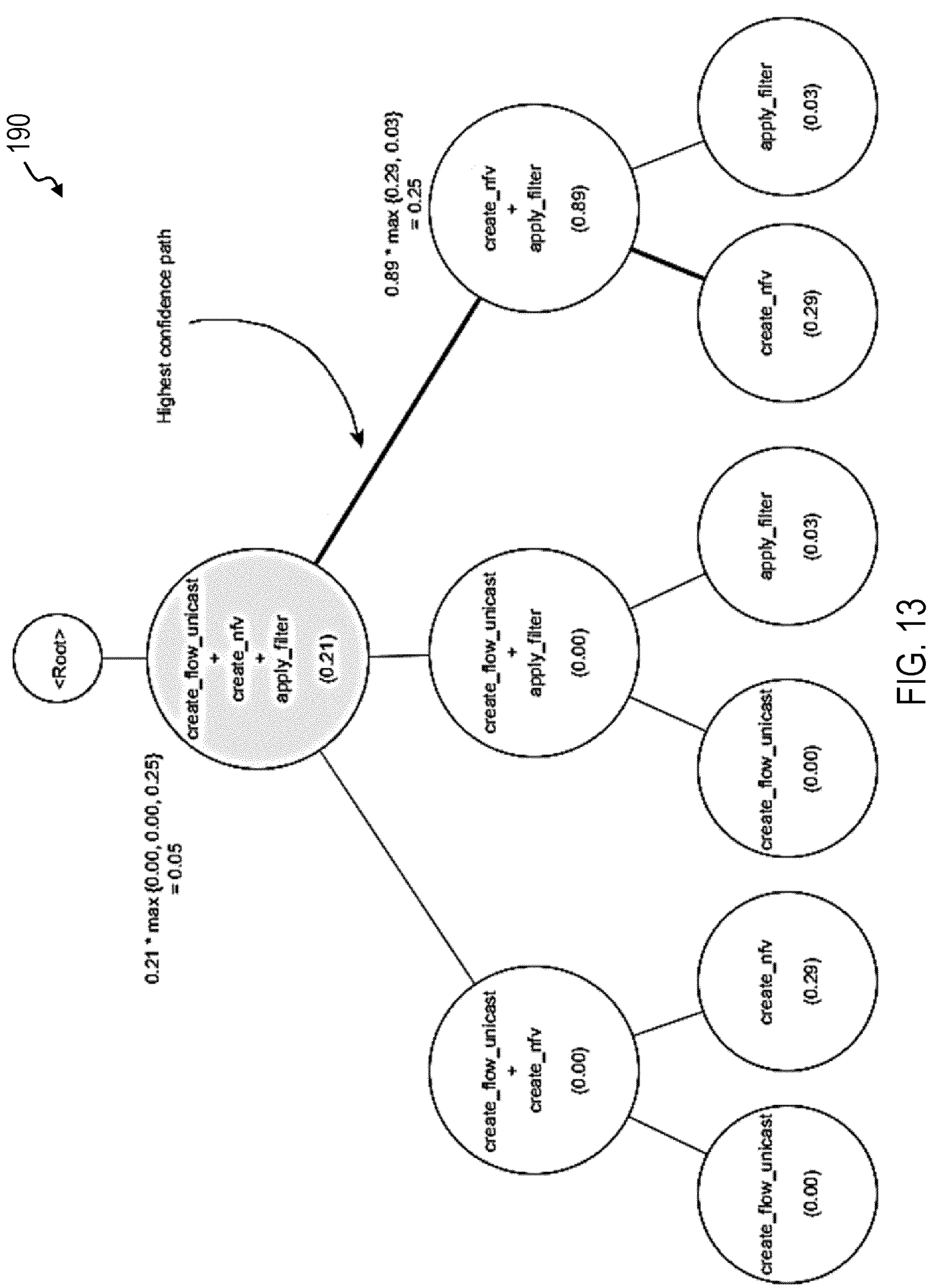
FIG. 13 and FIG. 14 are representations of confidence trees.
Figure 14:
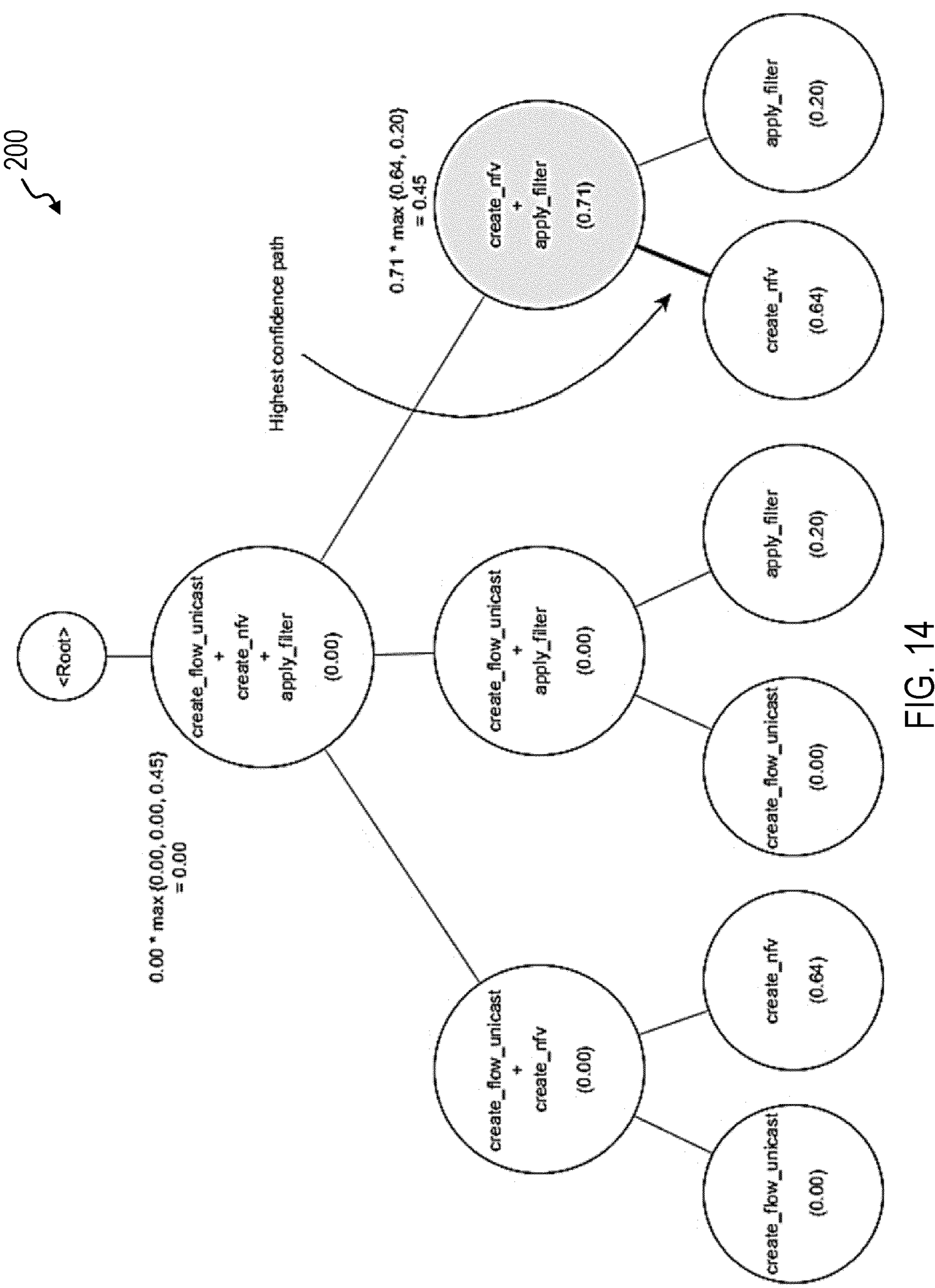

A process that may be used to (approximately) identify the target intent class using the confidence values from intent classification is described below:

1. Receiving natural language input x
2. The IBN performs a classification using a classifier that can classify the natural language input into pre-defined (simple and composite) intent classes C_1, C_2, . . . , C_n
3. c(x, C) is the classification confidence that input x belongs to any (simple and composite) class C
4. The confidence tree with the simple and composite intent classes as its nodes is constructed.
   a. FIGS. 13 and 14 show exemplary confidence trees in which there are only 2- and 3-composite intents
   b. The root node of the confidence tree has all 3-composite intent classes as its children
   c. Each 3-composite intent, in turn, has its constituent 2-composite intents as children.
   d. Each 2-composite intent has its constituent simple intents as children.
   e. While FIGS. 13 and 14 show trees for a case where there are at maximum 3-composite intents, the generation of the confidence tree for n>3 can be similarly performed, as explained in association with FIG. 12.
5. Assigning the classification confidence values to each node in the tree
6. Finding the highest confidence path:
   a. Start at a leaf node
   b. Keep moving upward to ancestor nodes as long as their confidence value is positive (i.e., non-zero)
   c. Stop on reaching an ancestor node with confidence value 0.0
   d. Multiply all the positive confidence values found along this path: call this as "path confidence"
   e. Repeat the process with all other leaf nodes
   f. Choose the path with the highest path confidence
      i. The root node's child with the highest confidence is most likely the desired intent class
      ii. However, the zero-confidence node (or its ancestors) can also be the desired intent
7. Confirm the intent class with the user FIG. 13 illustrates the confidence tree 190 for the natural language input "Create an HTTPS flow between mail server and database server through firewall." Except the root node, all other nodes correspond to the intent classes defined in the IBN. The 3-composite intent class is the child of the root, whereas the 2-composite classes are children of the former. The leaves represent the simple intent classes. The numeric values inside any node denotes the classification confidence of the corresponding intent class. The path highlighted with thick edges represent the high confidence path, whereas the highlighted intent class represent the target intent class. In this example, the path confidence value is 0.05. In other words, the input intent is found to be most similar to the 3-composite intent class, which is composed of three simple intents, create_flow_unicast, create_nfv, and apply_filter. Since this 3-composite class is the child of the root node, the IBN interprets this as the target class or target operation intended by the user.

FIG. 14 shows the confidence tree 200 for the natural language input "allow HTTPS communication between mail server and database server through firewall." In this case, the 2-composite intent class create_nfv+apply_filter is marked as the target intent class. However, since this class is not a direct child of the root node, the IBN asks the operator to confirm whether the actions of this intent class is required or that of its parent intent class's.

As mentioned above, natural language input may not only specify an intent class (which determines which command is to be generated), but also attributes of the command. For illustration, for configuring or reconfiguring a flow (which may be a communication flow, a power flow, or a fluid flow), the natural language input may specify at least the following parameters:

- source of the flow
- endpoint of the flow
- optionally, capacity of the flow path (maximum communication bandwidth, maximum power transmission, or maximum fluid flow rate)
- optional other attributes (such as margins or thresholds for alarms, warnings, or corrective actions).

Natural language processing performed by the command generation system 20 or IBN 120 may not only determine the intent class, but may also perform an entity resolution (and, if applicable, a resolution of the other attributes). Performing the entity resolution may comprise determining unique identifiers for controllable devices (such as Intelligent Electronic Devices (IEDs) in accordance with IEC 61850; for illustration, the IED(s) may be IED(s) compatible with one or several of IEC 61850-3:2013. IEC 61850-5:2013, and/or IEC 61850-6:2009) in the controlled utility system, industrial system, or communication network.

Figure 15:
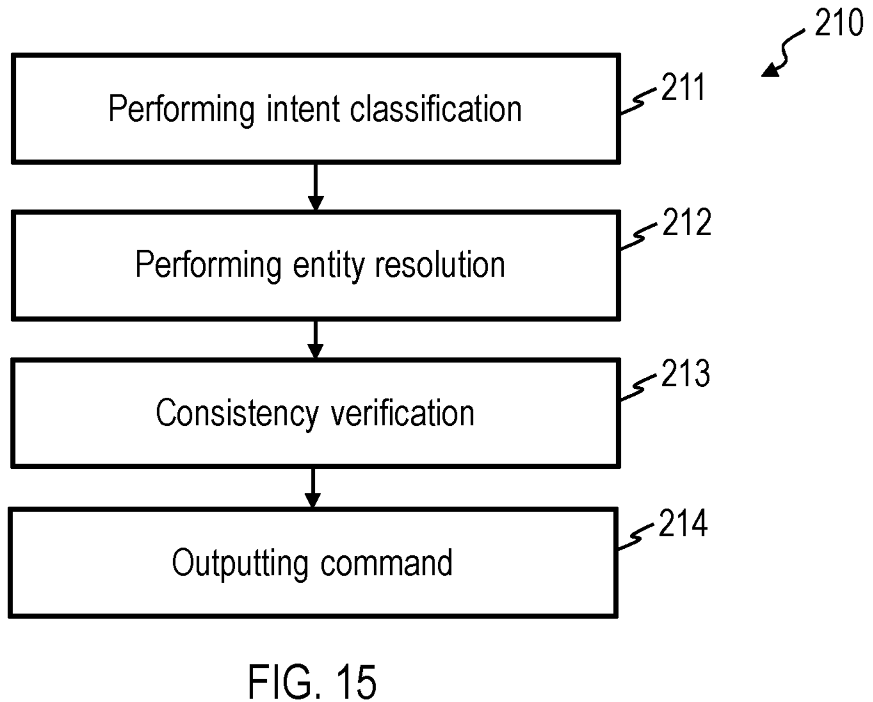
FIG. 15 is a flow chart of a method.

FIG. 15 is a flow chart of a method 210. The method 210 may be performed by the command generation system 20 or IBN 120.

At step 211, an intent classification is performed to determine the most likely or several possible intent classes for natural language input.

At step 212, an entity resolution is performed. NLP or NLU may be used to process the natural language input. The command generation system 20 or IBN 120 may use system information on the controlled utility system, industrial system, or communication network to determine addresses of devices (such as IEDs) to which the natural language input refers. For illustration, a standardized configuration description (SCD), in particular a standardized configuration language (SCL) file in accordance with IEC 61850 (e.g., in a substation file compatible with IEC 61850-6:2009) may be used in the process of identifying the system entities in the controlled system that are specified by the natural language input.

At step 213, a consistency verification may be performed. The consistency verification may include verifying that both the determined intent class and the determined system entities (and/or other attributes included in the natural language input) are consistent with one or several of previously identified intents, previously issued commands, and/or a current state of the controlled utility system, industrial system, or communication network. Alternatively or additionally, a (partial) ontology may be used in the process of determining the system entities. An exemplary implementation will be described with reference to FIG. 16. The partial ontology may be dependent on the type of system that is being controlled (i.e., electric power system, fluid flow grid, or communication network).

At step 214, a command may be generated based on the determined intent class, the determined system entities, and, if present, other attributes included in the natural language input. The command may be provided to an actor in the controlled utility system, industrial system, or communication network. The actor may implement the intent specified by the user's natural language input. This may involve generating, by the actor, instructions for execution by several system entities, including the system entities identified at step 212 and/or intermediate system entities located along a path between the system entities identified at step 212. Network topology information may be used, such as network topology information included in an SCL file or other SCD.

Figure 16:
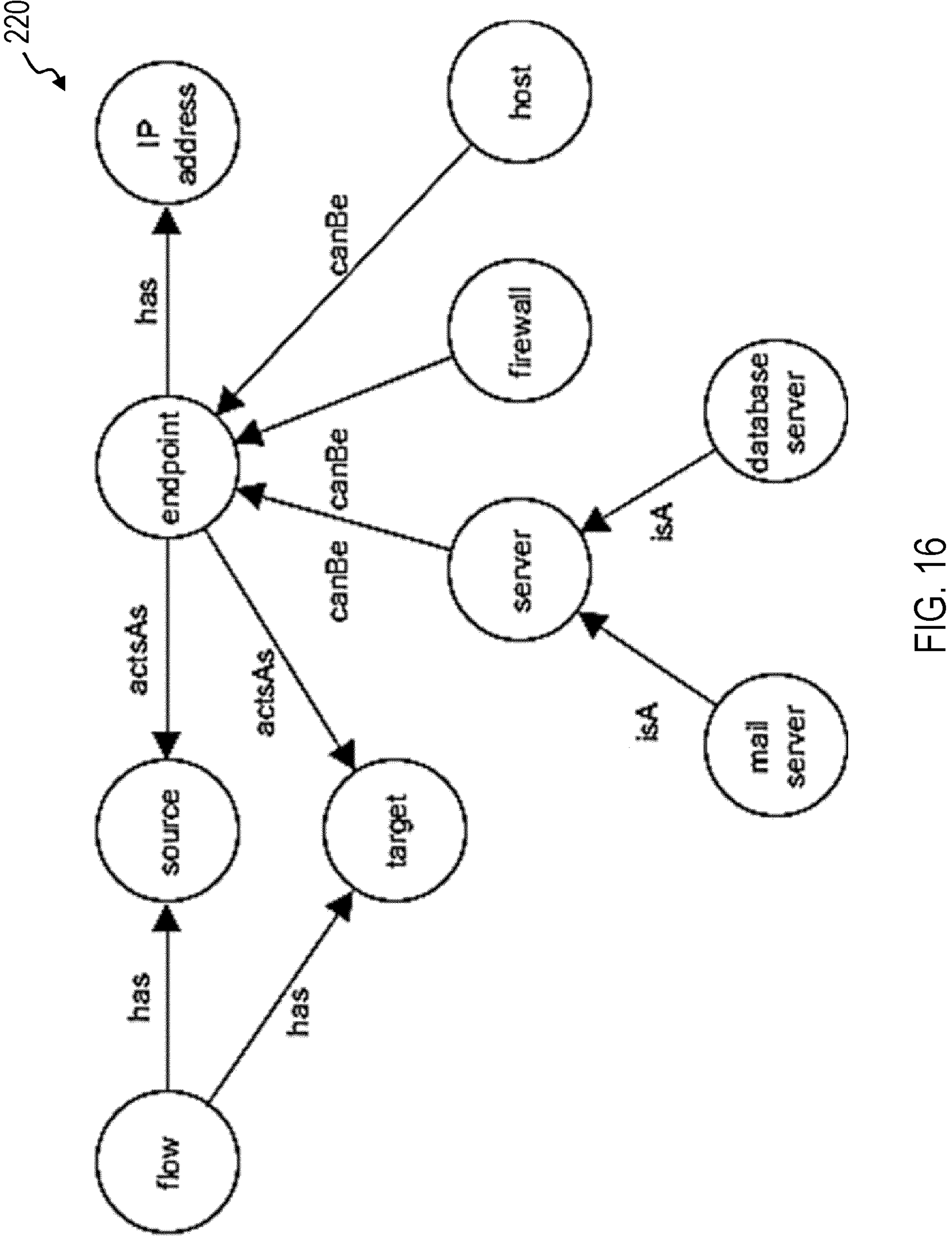
FIG. 16 is a diagram illustrating a partial network ontology.

FIG. 16 illustrates a partial network ontology 220 that may be used for system entity resolution. While FIG. 16 relates to a case in which the controlled system is a communication network (e.g., a communication network of a utility system or industrial system), a (partial) ontology of the controlled system may be used also for other controlled systems. For illustration, the create_unicast_flow intent class is considered, which requires two mandatory entities, "source" and "target." Assume that the IBN identifies the following entity name-value pair:

"source": "10.0.0.1"

"server": "database server"

Based on FIG. 16, a "database server" is essentially a "server," which, in turn, is an "endpoint." Moreover, any endpoint can act as a "target." This implies that the "database server" is equivalent to a "target" required by the intent. In addition, since all endpoints have IP address, the "database server," i.e., the "target." also has an IP address, which can be used to create the desired unicast flow.

Figure 17:
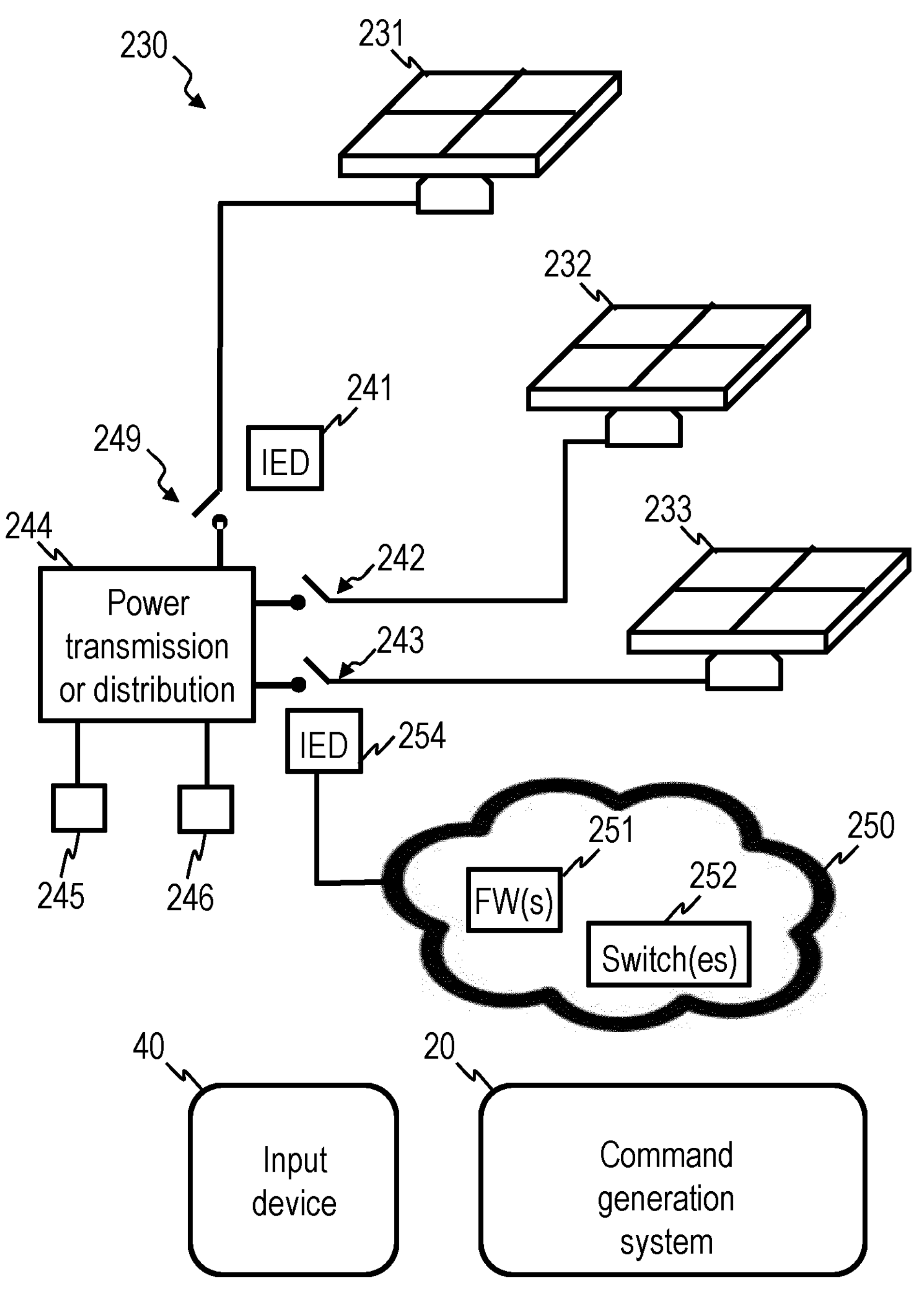
FIG. 17 is a diagram illustrating a system.

FIG. 17 is a schematic view of a system 230 in which an input device 40 and command generation system 20 can be used to generate and issue commands to a controlled system (in the present case, an electric power system).

The system 230 comprises a distributed energy resource (DER) or microgrid. Several generators 231-233 provide electric power. The DER or microgrid may also comprise several loads 245, 246 connected to the generator(s) 231-233 via an electric power transmission and/or distribution system 244. Circuit breaker(s) (CB(s)), protection relay(s), and/or other power switches 242, 243, 249 allow generators 231-233 and/or loads 245, 246 to be selectively coupled. IED(s) 241 are deployed for controlling primary components. The IED(s) may be communicatively coupled via a communication network 250. The communication network 250 may include communication devices, such as one or several firewalls 251 and/or one or several communication switch(es) 252.

The input device 40 may be used by a user to selectively configure or re-configure the communication network of the system 230 and/or to selectively configure or re-configure electric power flows of the system 230, using the techniques described in detail herein.

The input device 40 has a user interface for receiving natural language input. The user interface may comprise a graphical I/O unit, such as a touch- or proximity-sensing screen, a keyboard, or an acoustoelectric transducer such as a microphone.

The input device 40 may have a wireless or wired interface for connecting to the command generation system 20. The input device 40 may have a wireless interface that may be or may include a WLAN (e.g. Wi-Fi) or cellular (e.g., 4G or 5G) interface to connect to other networks or devices. The input device 40, for example, may use the wireless interface to send natural language input to the command generation system. The input device 40 may include user authentication mechanisms for connecting to the cloud.

In the illustrated embodiment, the command generation system 20 or IBN 120 are operative to determine which type of action is to be performed and which node(s) are affected by the action, in response to receiving natural language input. Information on the network action(s) that is/are to be performed are first received at the input device 40 and then processed by the command generation system 20 or IBN 120 to allow execution of the network action(s) to be triggered. The input device 40 may output identified intent classes and/or identified system entities for verification and confirmation by a user. Responsive to confirmation, the command generation system 20 or IBN 120 invokes an appropriate interface (for example, REST) of the NMS to trigger the action. The command generation system 20 or IBN 120 may use a wired or wireless interface to communication with an actor in the controlled system.

The command generation system 20 or IBN 120 may use system context (e.g., information on system topology included in a configuration description and/or information on a process description) to resolve the user's intent. e.g. by determining which action(s) are permissible. The command generation system 20 or IBN 120 may be operative such that the context information comprises data retrieved from a system configuration description and/or data retrieved from a process description, which may be stored or buffered by the command generation system 20 or IBN 120. The command generation system 20 or IBN 120 may be operative such that processing the natural language input may comprise determining, based on the context information, which actions are permissible. The command generation system 20 or IBN 120 may be operative such that the determined permissible network actions are used for interpreting the user's intent, as specified by the natural language input. The command generation system 20 or IBN 120 may be operative such that the determined permissible actions are used for determining which classifier(s) are to be applied to the natural language input. The command generation system 20 or IBN 120 may be operative such that the permissible network actions are used for selectively causing execution of the action(s) only if the action(s) are determined to be permissible network actions.

The command generation system 20 or IBN 120 may be operative to receive freehand user input via a graphical user interface, extract the natural language input from the freehand user input, and process the natural language input as described in detail herein.

Figure 18:
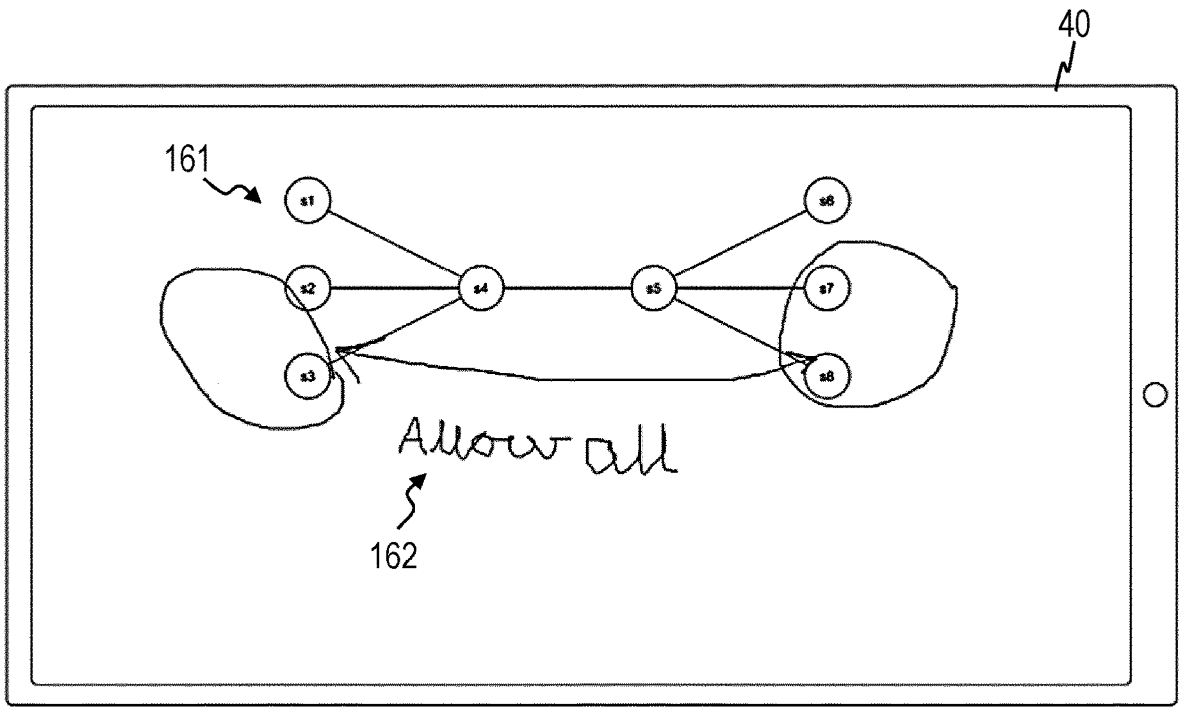
FIG. 18 is a schematic representation of an input device.

FIG. 18 is a schematic representation of an input device 40 having a graphical user interface (GUI). The command generation system 20. IBN 120, or input device 40 may be operative to cause graphics 161 representing at least part of a topology of the controlled system to be output via the GUI. The input device 40 may be operative to receive freehand user input at the GUI that includes natural language input 162. Processing of the freehand user input may be performed in the input device 40, the commend generation system 20, or the IBN 120 to identify the natural language input in the freehand user input. The identified natural language input may then be processed by the command generation system 20 or IBN 120 to generate and output a command to an actor (e.g., a management or control system) in the controlled system.

The systems, devices, and methods according to an embodiment allow actions in a utility system, industrial system, or communication network (in particular a communication network of a utility system or industrial system) to be managed using natural language input that can be conveniently input. The systems, devices, and methods allows a user (e.g., an operator or network engineer) to specify the action and cause execution of the action via a control or management system, without having to navigate through a menu-based interface of the control or management system, without having to keep track of the previously issued commands or previously stated intents, and/or without requiring knowledge of the command structure that is required by the control or management system. The appropriate action is triggered via the control or management system.

The systems, devices, and methods do not only reduce cognitive load of network engineers, but also reduce the risk of misconfiguration in managing a utility system, industrial system, or communication network.

The systems, devices, and methods provide various effects and benefits. The systems, devices, and methods provide a mechanism where a network engineer can specify his/her intended operation in an expressive manner without introducing ambiguity.

The systems, devices, and methods provide a simplified solution for incremental network management tasks The systems, devices, and methods provide afford equal ease in usage for both experts and new network engineers The systems, devices, and methods can be used to configure a to-be-commissioned utility system, industrial system, or communication network The systems, devices, and methods can be used to configure energy, fluid, or communication flows in a utility system, industrial system, or communication network.

While embodiments have been described in the context of communication networks and electric power systems, the methods and computer systems are not limited thereto. The disclosed systems, methods, and devices may be used for network management tasks in an IACS that may, but does not need to be a power system.

While embodiments have been described in detail in the drawings and foregoing description, such description is to be considered illustrative or exemplary and not restrictive. Variations to the disclosed embodiments can be understood and effected by those skilled in the art and practicing the claimed embodiments, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A command generation system for issuing commands to an actor of a utility system, industrial system or communication network, the command generation system implementing an Intent-based Network (IBN) and comprising:

a first interface operative to receive natural language input that specifies a task to be executed; and one or more processors operative to perform a stateful intent resolution process to determine a user's intent expressed by the natural language input, determine whether or not the determined intent is consistent with a previously determined intent, previously issued command, and state information on a state of the utility system, industrial system or communication network, when determining that the determined intent is not consistent, reject the natural language input, and output information that indicates the natural language input has been rejected, instead of generating and issuing any command, and when determining that the determined intent is consistent, generate at least one command based on the determined intent, and issue the at least one command to the actor to cause execution of the task in the utility system, industrial system or communication network, via a second interface.

2. The command generation system of claim 1, the command generation system being operative to maintain one or several intent transactions, and if a termination criterion is not fulfilled, use an intent transaction that provides information on previously identified intents within a same session to perform intent resolution.

3. The command generation system of claim 1, wherein the actor is a management or control system of a utility system, industrial system or communication network of a utility system or industrial system.

4. The command generation system of claim 1, wherein the command generation system is operative to quantitatively determine how reliable an identification of the user's intent is and to use confidence information to determine whether a command can be output automatically or whether user confirmation is required.

5. The command generation system of claim 1, wherein the command generation system comprises or is communicatively coupled to a data storage system that stores the information on previously identified intents and/or previously issued commands, wherein the command generation system is operative to cause storage of information on the determined intent and/or the least one command in the data storage system in response to a confirmation that the task has been executed in the utility system, industrial system or communication network.

6. The command generation system of claim 1, wherein the command generation system is operative to assign the natural language input to at least one intent class, the intent class being selected from a group consisting of a plurality of simple intents and a plurality of composite intents.

7. The command generation system of claim 6, wherein each composite intent of the plurality of composite intents is composed of two or more simple intents selected from the plurality of simple intents.

8. The command generation system of claim 6, wherein the command generation system is operative to automatically generate the plurality of composite intents by natural language processing (NLP)-based combinations of simple intents selected from the plurality of simple intents.

9. The command generation system of claim 6, wherein the stateful intent resolution process comprises assigning the natural language input to the at least one intent class, and wherein the command generation system is operative to determine confidence information that quantifies reliability of classification results for different intent classes, optionally wherein the command generation system is operative to use the confidence information to assign the natural language input to at least one intent class and/or to output the confidence information.

10. The command generation system of claim 9, wherein the command generation system is operative to generate a confidence tree to determine the confidence information.

11. The command generation system of claim 10, wherein each node of the confidence tree is associated with one of the plurality of simple intents or one of the plurality of composite intents, and/or the confidence tree comprises at least one node associated with one of the plurality of composite intents and at least two nodes each associated with simple intents selected from the plurality of simple intents, wherein a node of the confidence tree associated with one of the plurality of composite intents has child nodes that are associated with composite or simple intents from which the one of the plurality of composite intents is formed, and/or wherein determining the confidence information that quantifies the reliability of classification results for different intent classes comprises identifying a path through the tree from among all possible paths through the tree based on confidence values assigned to nodes and/or links of the confidence tree.

12. The command generation system of claim 6, wherein the command generation system is operative to identify one or several attributes for the at least one intent class from the natural language input, wherein the at least one command is dependent on the identified one or several attributes, optionally wherein the identified one or several attributes comprise one or several of: a source of a flow, a target of a flow, an action to be performed, a quality of service, an identifier for a virtual network function.

13. The command generation system of claim 1, wherein the command generation system is operative to establish an intent transaction in response to receipt of the natural language input if there is no active intent transaction for a user from which the natural language input is received, wherein at least an identifier for the determined intent expressed by the natural language input is included in the intent transaction, optionally wherein an execution time for the determined intent is included in the intent transaction;

if a termination criterion is not fulfilled, use the intent transaction to perform intent resolution and add further user's intents expressed by further natural language inputs of the same user into the intent transaction, comprising adding further identifiers for the user's further intents expressed by the further natural language inputs to the intent transaction, optionally wherein execution times for the user's further intents are added to the intent transaction; and if a termination criterion is fulfilled, terminate adding further user's intents to the intent transaction, optionally wherein the termination criterion comprises any one or any combination of a time threshold criterion, receipt of a command for terminating the intent transaction, receipt of a command to load a previous intent transaction, and/or optionally wherein the command generation system is operative to concurrently maintain and update a first intent transaction for a first user and a second intent transaction for a second user different from the first user.

14. The command generation system of claim 1, wherein the command generation system executes an intent supervisor operative to continually monitor the utility system, industrial system or communication network and to ensure automatic adaptation of the command generation system to changes in the utility system, industrial system or communication network.

15. The command generation system of claim 14, wherein ensuring automatic adaptation of the command generation system to changes in the utility system, industrial system or communication network comprises one or more of:

automatically generating and issuing at least one additional command in response to detecting a change in topology and/or entity states to ensure that the utility system, industrial system or communication network remains operative in accordance with the user's intent expressed by the natural language input; or verifying that execution of the at least one command causes the utility system, industrial system or communication network to reach a target state.

16. The command generation system of claim 1, wherein the first interface is operative to receive the natural language input as text input, optionally wherein the first interface is a web-based interface; and/or wherein the first interface is operative to receive the natural language input as speech input, optionally wherein the command generation system comprises a speech-to-text conversion module to convert the speech input to text input prior to performing the stateful intent resolution process; and/or wherein the first interface is operative to receive the natural language input as freehand user input via a graphical user interface.

17. A system, comprising:

a utility system, industrial system or communication network having an actor, wherein the actor is a management or control system, and wherein the utility system, industrial system or communication network comprises at least one of an electric power system and an electric power system communication network; and the command generation system of claim 1 operative to issue the at least one command to the actor.

18. A method of issuing commands to a utility system, industrial system or communication network, using an Intent-based network (IBN), the method comprising:

receiving natural language input that specifies a task;

performing a stateful intent resolution process to determine a user's intent expressed by the natural language input;

determine whether or not the determined intent is consistent with a previously determined intent, previously issued command, and state information on a state of the utility system, industrial system or communication network;

when determining that the determined intent is not consistent, reject the natural language input, and output information that indicates the natural language input has been rejected, instead of generating and issuing any command; and when determining that the determined intent is consistent, generating at least one command based on the determined intent, and issuing the at least one command to an actor of the utility system, industrial system or communication network for execution of the task.

* * * * *